(12) United States Patent
Kasahara et al.

(10) Patent No.: US 12,123,543 B2
(45) Date of Patent: Oct. 22, 2024

(54) INCLINATION SENSOR AND DATA ACQUISITION DEVICE

(71) Applicant: Topcon Corporation, Tokyo (JP)

(72) Inventors: Fumitoshi Kasahara, Tokyo (JP); Fumio Ohtomo, Tokyo (JP); Naoki Shoji, Tokyo (JP); Masae Matsumoto, Tokyo (JP); Jun Abe, Tokyo (JP)

(73) Assignee: Topcon Corporation, Tokyo (JP)

(*) Notice: Subject to any disclaimer, the term of this patent is extended or adjusted under 35 U.S.C. 154(b) by 426 days.

(21) Appl. No.: 17/655,548

(22) Filed: Mar. 19, 2022

(65) Prior Publication Data

US 2022/0307646 A1 Sep. 29, 2022

(30) Foreign Application Priority Data

Mar. 26, 2021 (JP) ................. 2021-053570

(51) Int. Cl.
*G01C 15/00* (2006.01)
*F16M 11/12* (2006.01)
*F16M 11/18* (2006.01)

(52) U.S. Cl.
CPC ........... *F16M 11/123* (2013.01); *F16M 11/18* (2013.01); *G01C 15/008* (2013.01)

(58) Field of Classification Search
CPC .................................................. G01C 15/008
USPC ........................................................ 33/290
See application file for complete search history.

(56) References Cited

U.S. PATENT DOCUMENTS

| 6,044,567 | A | * | 4/2000 | Feist | G01C 15/08 33/290 |
| 8,857,069 | B2 | * | 10/2014 | Adegawa | G01C 9/00 33/291 |
| 9,365,413 | B2 | * | 6/2016 | Barrilado | G01P 15/0802 |
| 9,395,174 | B2 | * | 7/2016 | Bridges | G06T 7/73 |
| 10,048,377 | B2 | * | 8/2018 | Ohtomo | G01S 17/42 |
| 10,690,497 | B2 | * | 6/2020 | Nagashima | G01C 15/08 |
| 10,895,456 | B1 | * | 1/2021 | Nakamura | G01C 3/04 |
| 11,500,096 | B2 | * | 11/2022 | Nishita | G01S 7/4817 |
| 11,905,003 | B2 | * | 2/2024 | Kopp | B64C 27/605 |

(Continued)

FOREIGN PATENT DOCUMENTS

| EP | 3136049 A1 | 1/2017 |
| JP | 2016-151423 A | 8/2016 |

OTHER PUBLICATIONS

Extended European Search Report mailed Sep. 1, 2022 in connection with European Patent Application No. 22163088.2, 8 pgs.

*Primary Examiner* — George B Bennett
(74) *Attorney, Agent, or Firm* — Chiesa Shahinian & Giantomasi PC

(57) ABSTRACT

The inclination sensor includes a gimbal mechanism rotatably supported around a first shaft and a second shaft, a first motor, a second motor, an acceleration sensor disposed in the gimbal mechanism with an origin point of coordinate axes being coincident with a point of intersection of a shaft center of the first shaft and a shaft center of the second shaft, and a control unit that simultaneously rotates the first shaft and the second shaft to continuously rotate the acceleration sensor around the first shaft and the second shaft and applies frequency analysis to the output values from the acceleration sensor to arithmetically determine the inclination angle with respect to the horizontal direction.

8 Claims, 15 Drawing Sheets

(56) References Cited

U.S. PATENT DOCUMENTS

| | | | |
|---|---|---|---|
| 2012/0216413 A1* | 8/2012 | Adegawa | G01C 9/00 33/290 |
| 2012/0316685 A1* | 12/2012 | Pettersson | F16M 11/2014 248/560 |
| 2015/0335311 A1* | 11/2015 | Havel | A61B 8/4461 600/463 |
| 2016/0238708 A1 | 8/2016 | Ohtomo et al. | |

* cited by examiner

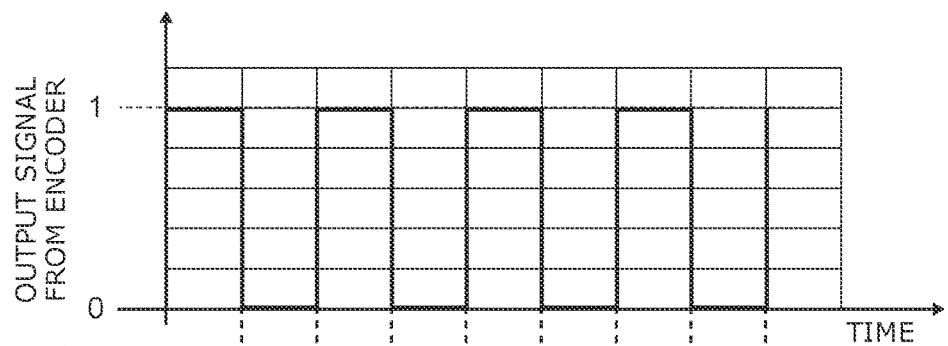
FIG. 7A
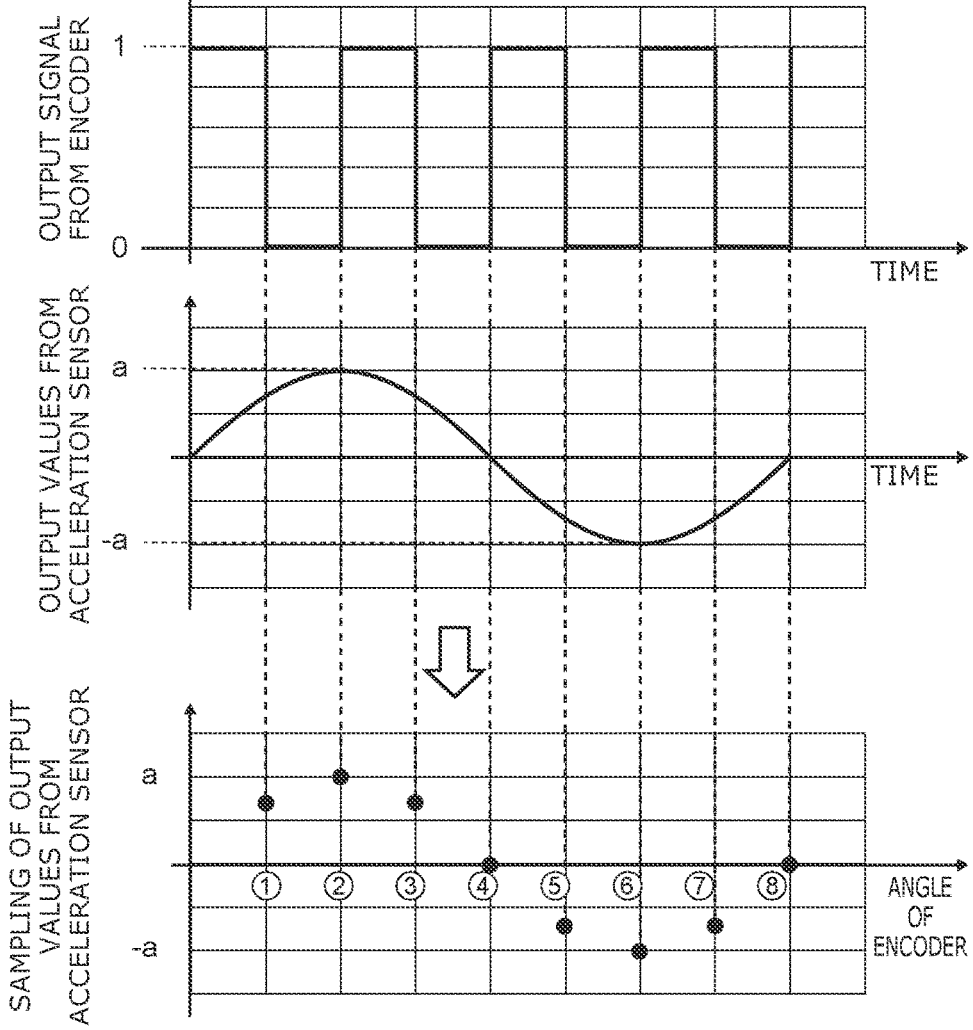
FIG. 7B
FIG. 7C

INCLINATION SENSOR AND DATA ACQUISITION DEVICE

CROSS-REFERENCE TO RELATED APPLICATIONS

This application claims priority to Japanese Patent Application No. 2021-053570, filed Mar. 26, 2021, the disclosure of which is incorporated herein by reference in its entirety.

FIELD OF THE INVENTION

The present invention relates to an inclination sensor to be provided in a data acquisition device that requires sensing of an inclination angle with respect to a horizontal direction, such as a surveying device or an image acquisition device, and to the data acquisition device including the inclination sensor.

BACKGROUND

Examples of a sensor that detects an inclination angle of a data acquisition device, such as a surveying device or an image acquisition device, with respect to a horizontal direction include a tilt sensor. However, while being able to detect the horizontal with high accuracy, the tilt sensor has a problem of a relatively narrow range in which the inclination angle is to be detected.

Meanwhile, Japanese Patent Application Publication No. 2016-151423 discloses an attitude detection device including a tilt sensor and an acceleration sensor. Compared to the tilt sensor, the acceleration sensor can detect a larger inclination angle. Therefore, the attitude detection device described in Japanese Patent Application Publication No. 2016-151423 can detect any attitude, while ensuring detection accuracy. However, when the attitude detection device includes both of the tilt sensor and the acceleration sensor, the attitude detection device is increased in size, in which respect the attitude detection device described in Japanese Patent Application Publication No. 2016-151423 has room for improvement.

Accordingly, to achieve a size reduction of an inclination sensor that senses an inclination angle with respect to a horizontal direction, it can be considered to provide only an acceleration sensor without providing a tilt sensor. However, the acceleration sensor has a problem of detection accuracy lower than that of the tilt sensor. In other words, when the acceleration sensor is affected by a change in environment such as a temperature, an atmospheric pressure, a humidity, or a magnetic field, drift may occur in output values from the acceleration sensor. Otherwise, when the acceleration sensor continues to be affected by the change in environment, the output values from the acceleration sensor change with time, and drift may occur in the output values from the acceleration sensor. In some cases, the inclination sensor used in the data acquisition device such as the surveying device or the image acquisition device may be expected to sense the inclination angle with respect to the horizontal direction in real time.

SUMMARY OF THE INVENTION

The present invention has been achieved in order to solve the problem described above, and an object of the present invention is to provide an inclination sensor that can ensure accuracy of detecting an inclination angle with respect to a horizontal direction even when drift occurs in output values from an acceleration sensor and can sense the inclination angle with respect to the horizontal direction in real time and a data acquisition device including the inclination sensor.

The problem described above is solved by an inclination sensor according to the present invention including: a gimbal mechanism having a first shaft and a second shaft perpendicular to the first shaft and rotatably supported around the first shaft and the second shaft; a first motor that rotates the first shaft; a second motor that rotates the second shaft; an acceleration sensor disposed in the gimbal mechanism with an origin point of coordinate axes being coincident with a point of intersection of a shaft center of the first shaft and a shaft center of the second shaft; and a control unit that drives the first motor and the second motor to simultaneously rotate the first shaft and the second shaft and thereby continuously rotate the acceleration sensor around the first shaft and the second shaft, and applies frequency analysis to output values from the acceleration sensor to arithmetically determine an inclination angle with respect to a horizontal direction.

In the inclination sensor according to the present invention, the acceleration censor is disposed in the gimbal mechanism with the origin point of the coordinate axes being coincident with the point of intersection of the shaft center of the first shaft and the shaft center of the second shaft in the gimbal mechanism. The control unit drives the first motor and the second motor to simultaneously rotate the first shaft and the second shaft and thereby continuously rotate the acceleration sensor around the first shaft and the second shaft. The control unit also applies the frequency analysis to the output values from the acceleration sensor to arithmetically determine the inclination angle with respect to the horizontal direction. Thus, the control unit of the inclination sensor according to the present invention arithmetically determines the inclination angle with respect to the horizontal direction not on the basis of the output values from the acceleration sensor, but on the basis of a result of applying the frequency analysis to the output values from the acceleration sensor. This allows the control unit to arithmetically determine the inclination angle with respect to the horizontal direction by applying the frequency analysis to the output values from the acceleration sensor instead of acquiring high-accuracy output values from the acceleration sensor. By thus using the frequency analysis, the inclination sensor according to the present invention can ensure accuracy of detecting the inclination angle with respect to the horizontal direction even when drift occurs in the output values from the acceleration sensor. In addition, since there is no need for a tilt sensor capable of high-accuracy detection or the like, it is possible to reduce a size of the inclination sensor.

As a result of the simultaneous rotation of the first shaft and the second shaft by the control unit, each of axes (e.g., an X-axis, a Y-axis, and a Z-axis) of the acceleration sensor is affected by the rotation of both of the first motor and the second motor. By contrast, by applying the frequency analysis to the output values from the acceleration sensor, the control unit of the inclination sensor according to the present invention can separate behaviors of the individual axes (e.g., the X-axis, the Y-axis, and the Z-axis) when the first motor rotates from behaviors of the individual axes (e.g., the X-axis, the Y-axis, and the Z-axis) when the second motor rotates, and can ensure the accuracy of detecting the inclination angle with respect to the horizontal direction. In other words, the control unit can arithmetically determine the inclination angle with respect to the horizontal direction by driving the first motor and the second motor to simultaneously rotate the first shaft and the second shaft instead of, e.g., driving only the first motor to rotate only the first shaft or driving only the second motor to rotate only the second shaft, and applying the frequency analysis to the output values from the acceleration sensor. As a result, the control unit need not individually arithmetically determine the inclination angles with respect to the horizontal direction when only the first shaft is rotated and when only the second shaft is rotated, and can arithmetically determine the inclination angle with respect to the horizontal direction by simultaneously rotating the first shaft and the second shaft. This allows the inclination sensor according to the present invention to sense the inclination angle with respect to the horizontal direction in real time.

It is preferable that the inclination sensor according to the present invention further includes: a first encoder that detects a rotation angle of the first shaft rotated by the first motor; and a second encoder that detects a rotation angle of the second shaft rotated by the second motor, wherein the control unit arithmetically determines the inclination angle on the basis of at least one of the rotation angle of the first shaft from a reference position that is detected by the first encoder and the rotation angle of the second shaft from the reference position that is detected by the second encoder when the frequency analysis is applied to the output values from the acceleration sensor.

In the inclination sensor according to the present invention, the control unit arithmetically determines the inclination angle with respect to the horizontal direction on the basis of at least one of the rotation angle of the first shaft from the reference position that is detected by the first encoder and the rotation angle of the second shaft from the reference position that is detected by the second encoder when the frequency analysis is applied to the output values from the acceleration sensor. In other words, the control unit arithmetically determines the inclination angle with respect to the horizontal direction on the basis of at least one of a phase of the first encoder and a phase of the second encoder when the frequency analysis is applied to the output values from the acceleration sensor. This allows the inclination sensor according to the present invention to ensure accuracy of detecting the inclination angle with respect to the horizontal direction and sense the inclination angle with respect to the horizontal direction in real time.

It is preferable that, in the inclination sensor according to the present invention, the control unit acquires the output values from the acceleration sensor at timing at which at least one of the rotation angle of the first shaft detected by the first encoder and the rotation angle of the second shaft detected by the second encoder exhibits a predetermined angle, and synchronizes at least one of the rotation angle of the first shaft and the rotation angle of the second shaft with the output values from the acceleration sensor.

In the inclination sensor according to the present invention, the control unit synchronizes at least one of the rotation angle of the first shaft and the rotation angle of the second shaft with the output values from the acceleration sensor. This can prevent a relationship between timing at which the acceleration sensor exhibits predetermined output values and each of the rotation angle of the first shaft and the rotation angle of the second shaft at that timing from varying. In addition, the control unit acquires the output values from the acceleration sensor at the timing at which at least one of the rotation angle of the first shaft detected by the first encoder and the rotation angle of the second shaft detected by the second encoder exhibits the predetermined angle. In other words, the control unit executes sampling of the output values from the acceleration sensor not at fixed time intervals, but at each given angle of at least one of the first encoder and the second encoder. As a result, even in a case where, when, e.g., the acceleration sensor rotates, at least one of the first motor and the second motor is accelerated or decelerated due to imbalance of a rotating body such as the acceleration sensor or the gimbal mechanism, it is possible to more reliably prevent the relationship between the timing at which the acceleration sensor exhibits the predetermined output values and each of the rotation angle of the first shaft and the rotation angle of the second shaft at that timing from varying, and more reliably synchronize at least one of the rotation angle of the first shaft and the rotation angle of the second shaft with the output values from the acceleration sensor.

It is preferable that, in the inclination sensor according to the present invention, the control unit senses the timing on the basis of at least one of an output signal from the first encoder and an output signal from the second encoder.

In the inclination sensor according to the present invention, the control unit uses at least one of the output signals from the first encoder and the second encoder as a trigger to acquire the output values from the acceleration sensor and synchronize at least one of the rotation angle of the first shaft and the rotation angle of the second shaft with the output values from the acceleration sensor. As a result, it is possible to more reliably prevent the relationship between the timing at which the acceleration sensor exhibits the predetermined output values and each of the rotation angle of the first shaft and the rotation angle of the second shaft at that timing from varying and more reliably synchronize at least one of the rotation angle of the first shaft and the rotation angle of the second shaft with the output values from the acceleration sensor.

It is preferable that, in the inclination sensor according to the present invention, the control unit matches at least one of a control cycle period of the first motor and a control cycle period of the second motor with a time interval at which the output values from the acceleration sensor are acquired.

In the inclination sensor according to the present invention, even when at least one of the first motor and the second motor is periodically accelerated or decelerated, it is possible to prevent the periodic acceleration or deceleration of the first motor and the second motor from affecting the output values from the acceleration sensor. This allows the inclination sensor according to the present invention to detect the inclination angle with higher accuracy.

It is preferable that, in the inclination sensor according to the present invention, the first shaft extends in a front-rear direction, the second shaft extends in a left-right direction, and the coordinate axes include an X-axis coincident with the shaft center of the first shaft and a Y-axis coincident with the shaft center of the second shaft.

In the inclination sensor according to the present invention, the X-axis among the coordinate axes of the acceleration sensor coincides with the shaft center of the first shaft extending in the front-rear direction. Meanwhile, the Y-axis among the coordinate axes of the acceleration sensor coincides with the shaft center of the second shaft extending in the left-right direction. This allows the inclination sensor according to the present invention to detect the inclination angle with higher accuracy, while preventing influence dependent on the first motor and the second motor.

It is preferable that, in the inclination sensor according to the present invention, the control unit arithmetically determines a rotation speed of the first shaft on the basis of the rotation angle of the first shaft detected by the first encoder, arithmetically determines a rotation speed of the second shaft on the basis of the rotation angle of the second shaft detected by the second encoder, and performs an arithmetic operation to remove a component related to a centrifugal force which is included in the output values from the acceleration sensor due to the rotation speed of the first shaft and the rotation speed of the second shaft.

In the inclination sensor according to the present invention, even when the output values from the acceleration sensor include an acceleration due to the effect of a centrifugal force generated in the acceleration sensor when, e.g., each of the first shaft and the second shaft rotates at a given speed, a centrifugal force generated in the acceleration sensor when the coordinate axes of the acceleration sensor do not coincide with the shaft center of the first shaft and the shaft center of the second shaft, or the like, the control unit arithmetically determines the rotation speed of the first shaft and the rotation speed of the second shaft and executes an arithmetic operation to remove the component related to the centrifugal force included in the output values from the acceleration sensor due to at least one of the rotation speed of the first shaft and the rotation speed of the second shaft. This allows the inclination sensor according to the present invention to detect the inclination angle with higher accuracy.

The problem described above is solved by a data acquisition device according to the present invention including: a distance measurement unit including a beam emission element that emits a measurement beam, a measurement beam ejection unit that ejects the measurement beam, a beam reception unit that receives a reflected measurement beam, and a beam reception element that receives the reflected measurement beam and generates a beam reception signal, the distance measurement unit measuring a distance to an object to be measured on the basis of the beam reception signal from the beam reception element; any of the inclination sensors described above; and a control unit that controls the distance measurement unit, the control unit of the inclination sensor being a first control unit, the control unit that controls the distance measurement unit being a second control unit.

In the data acquisition device according to the present invention, the acceleration censor included in the inclination sensor is disposed in the gimbal mechanism with the origin point of the coordinate axes being coincident with the point of intersection of the shaft center of the first shaft and the shaft center of the second shaft in the gimbal mechanism. The first control unit drives the first motor and the second motor to simultaneously rotate the first shaft and the second shaft and thereby continuously rotate the acceleration sensor around the first shaft and the second shaft. The first control unit also applies the frequency analysis to the output values from the acceleration sensor to arithmetically determine the inclination angle with respect to the horizontal direction. Thus, the first control unit of the inclination sensor of the data acquisition device according to the present invention arithmetically determines the inclination angle with respect to the horizontal direction not on the basis of the output values from the acceleration sensor, but on the basis of a result of applying the frequency analysis to the output values from the acceleration sensor. This allows the first control unit to arithmetically determine the inclination angle with respect to the horizontal direction by applying the frequency analysis to the output values from the acceleration sensor instead of acquiring high-accuracy output values from the acceleration sensor. By thus using the frequency analysis, the inclination sensor of the data acquisition device according to the present invention can ensure accuracy of detecting the inclination angle with respect to the horizontal direction even when drift occurs in the output values from the acceleration sensor. In addition, since there is no need for a tilt sensor capable of high-accuracy detection or the like, it is possible to reduce a size of the inclination sensor. This can reduce a size of the data acquisition device.

As a result of the simultaneous rotation of the first shaft and the second shaft by the first control unit, each of the axes (e.g., the X-axis, the Y-axis, and the Z-axis) of the acceleration sensor is affected by the rotation of both of the first motor and the second motor. By contrast, by applying the frequency analysis to the output values from the acceleration sensor, the first control unit of the inclination sensor of the data acquisition device according to the present invention can separate the behaviors of the individual axes (e.g., the X-axis, the Y-axis, and the Z-axis) when the first motor rotates from the behaviors of the individual axes (e.g., the X-axis, the Y-axis, and the Z-axis) when the second motor rotates, and can ensure the accuracy of detecting the inclination angle with respect to the horizontal direction. In other words, the first control unit can arithmetically determine the inclination angle with respect to the horizontal direction by driving the first motor and the second motor to simultaneously rotate the first shaft and the second shaft, instead of, e.g., driving only the first motor to rotate only the first shaft or driving only the second motor to rotate only the second shaft, and applying the frequency analysis to the output values from the acceleration sensor. As a result, the first control unit need not individually arithmetically determine the inclination angles with respect to the horizontal direction when only the first shaft is rotated and when only the second shaft is rotated, and can arithmetically determine the inclination angle with respect to the horizontal direction by simultaneously rotating the first shaft and the second shaft. This allows the inclination sensor of the data acquisition device according to the present invention to sense the inclination angle with respect to the horizontal direction in real time.

According to the present invention, it is possible to provide the inclination sensor that can ensure accuracy of detecting the inclination angle with respect to the horizontal direction even when drift occurs in the output values from the acceleration sensor and can sense the inclination angle with respect to the horizontal direction in real time and the data acquisition device including the inclination sensor.

BRIEF DESCRIPTION OF THE DRAWINGS

FIGS. 7A to 7C are graphs illustrating timing at which a control unit in the present embodiment acquires the output values from the acceleration sensor;

DETAILED DESCRIPTION

Figure 1:
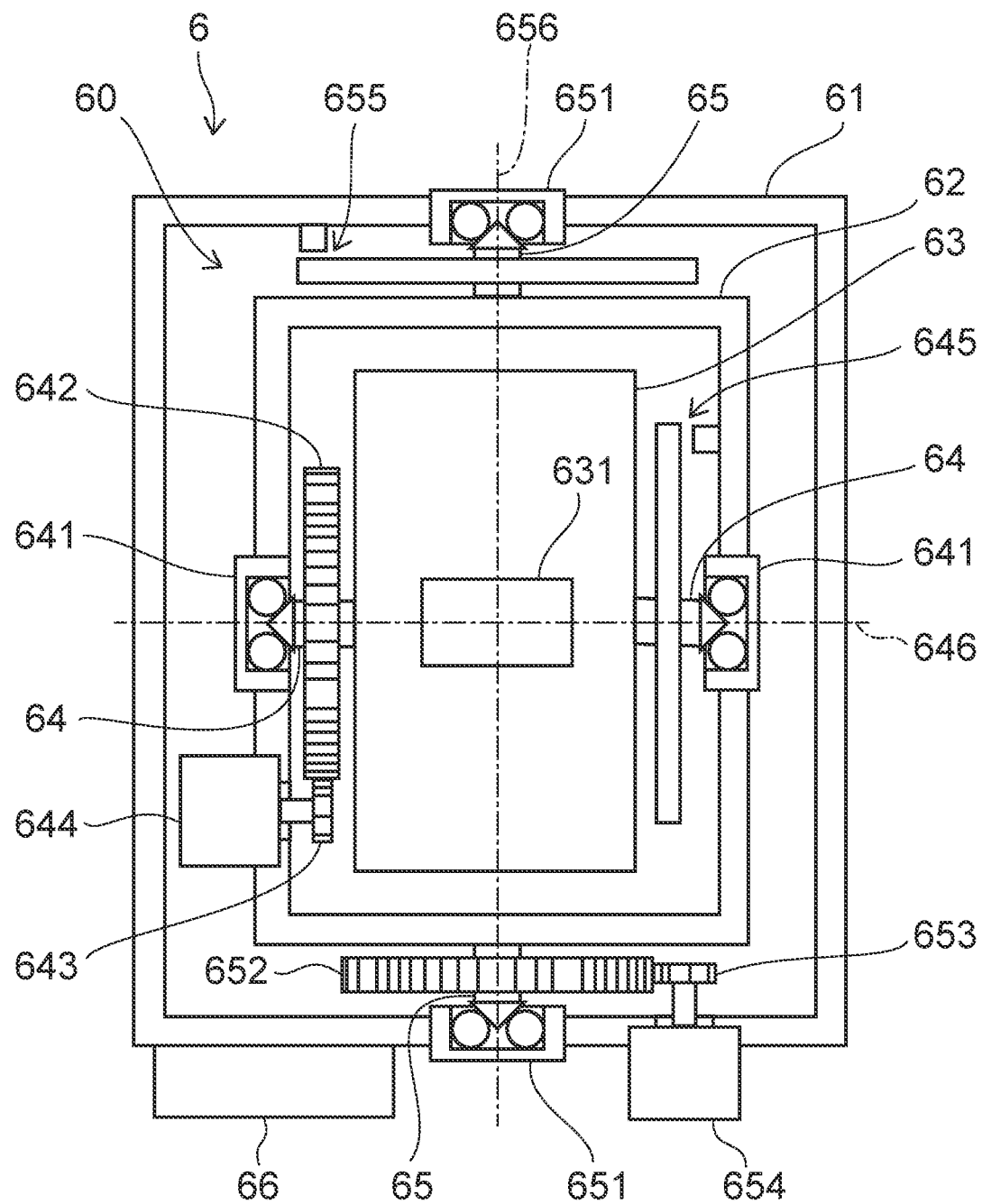
FIG. 1 is a schematic view illustrating an inclination sensor according to an embodiment of the present invention.

The following will describe a preferred embodiment of the present invention in detail with reference to the drawings.

It should be noted that, since the embodiment described below is a preferred specific example of the present invention, a variety of technically preferable limitations are given, but the scope of the invention is not limited to these aspects unless there is a description made specifically to limit the present invention. In addition, in the drawings, the same components are denoted by the same reference numerals, and a detailed description thereof will be omitted as appropriate.

FIG. 1 is a schematic view illustrating an inclination sensor according to the embodiment of the present invention.

Figure 2:
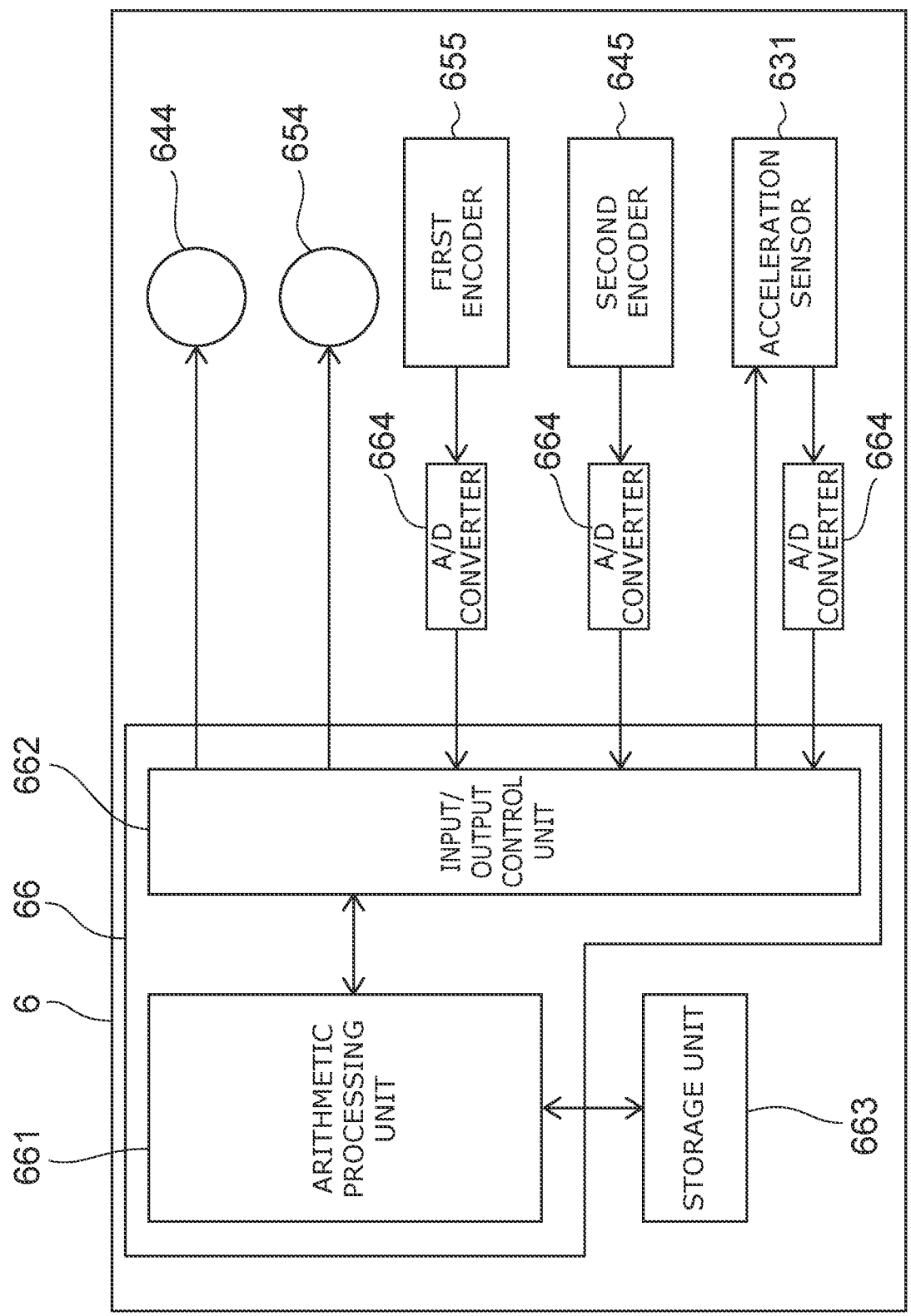
FIG. 2 is a block diagram illustrating the inclination sensor according to the present embodiment.

FIG. 2 is a block diagram illustrating the inclination sensor according to the present embodiment.

Note that, in the schematic view illustrated in FIG. 1, a gravity direction and a direction opposite to the gravity direction are each perpendicular to a surface of a paper sheet with FIG. 1.

An inclination sensor 6 according to the present embodiment includes an outer frame 61 having a rectangular frame shape, an inner frame 62 having a rectangular frame shape and provided inside the outer frame 61, and an inclination detection unit 63 provided inside the inner frame 62.

The inclination detection unit 63 is supported on a left-right shaft 64. The left-right shaft 64 in the present embodiment is an example of a "second shaft" in the present invention. Both end portions of the left-right shaft 64 are rotatably fitted into bearings 641 provided in the inner frame 62. The left-right shaft 64 has a left-right shaft center 646. The inclination detection unit 63 is 360° rotatable in a front-rear direction around the left-right shaft 64.

Front-rear shafts 65 are provided so as to protrude from a rear surface (an upper surface in FIG. 1) and a front surface (a lower surface in FIG. 1) of the inner frame 62. Each of the front-rear shafts 65 in the present embodiment is an example of a "first shaft" in the present invention. The front-rear shafts 65 are rotatably fitted into bearings 651 provided in the outer frame 61. The front-rear shafts 65 have a front-rear shaft center 656 perpendicular to the left-right shaft center 646. The inner frame 62 is 360° rotatable in a left-right direction around the front-rear shafts 65.

The inclination detection unit 63 is supported to be rotatable in two axial directions with respect to the outer frame 61. A mechanism that rotatably supports the inner frame and a mechanism that rotatably supports the inclination detection unit 63 are included in a gimbal mechanism 60. The inclination detection unit 63 is supported with respect to the outer frame 61 via the gimbal mechanism 60. Since there is no mechanism that restricts rotation of the inner frame 62, the inclination detection unit 63 can freely rotate in all directions with respect to the outer frame 61.

One end portion of the left-right shaft 64 is fitted with a second driven gear 642. The second driven gear 642 is engaged with a second drive gear 643. In addition, in a side surface (a left side surface in FIG. 1) of the inner frame 62, a second motor 644 is provided. An output shaft of the second motor 644 is fitted with the second drive gear 643.

Another end portion of the left-right shaft 64 is provided with a second encoder 645. The second encoder 645 detects a rotation angle of the inclination detection unit 63 with respect to the inner frame 62 in the front-rear direction, i.e., a degree of rotation of the left-right shaft 64. Examples of the second encoder 645 include an increment-type rotary encoder, an absolute-type rotary encoder, and the like.

One (the lower one in FIG. 1) of the front-rear shafts 65 is fitted with a first driven gear 652. The first driven gear 652 is engaged with a first drive gear 653. In addition, in a lower surface of the outer frame 61, a first motor 654 is provided. An output shaft of a first motor 654 is fitted with the first drive gear 653.

Another one (the upper one in FIG. 1) of the front-rear shafts 65 is provided with a first encoder 655. The first encoder 655 detects a rotation angle of the inner frame 62 with respect to the outer frame 61 in the left-right direction, i.e., a degree of rotation of the front-rear shaft 65. Examples of the first encoder 655 include an increment-type rotary encoder, an absolute-type rotary encoder, and the like.

As illustrated in FIG. 2, a control unit 66 includes an arithmetic processing unit 661 and an input/output control unit 662. The control unit 66 in the present embodiment is an example of a "control unit of an inclination sensor", i.e., a "first control unit" in the present invention. The first encoder 655 is electrically connected to the input/output control unit 662 via an A/D converter 664. The second encoder 645 is electrically connected to the input/output control unit 662 via the A/D converter 664.

The inclination detection unit 63 includes an acceleration sensor 631. The acceleration sensor 631 is electrically connected to the input/output control unit 662. Specifically, the acceleration sensor 631 transmits a detection signal to the input/output control unit 662 via the A/D converter 664. The acceleration sensor 631 also receives a control signal transmitted from the input/output control unit 662.

Referring to FIG. 2, a further description will be given of the inclination sensor 6.

The inclination sensor 6 includes the first encoder 655, the second encoder 645, the acceleration sensor 631, the first motor 654, the second motor 644, a storage unit 663, and the control unit 66. The control unit 66 includes the arithmetic processing unit 661 and the input/output control unit 662.

The storage unit 73 stores programs such as an arithmetic program for detecting an inclination angle and data items such as an arithmetic data item.

The input/output control unit 662 drives the first motor 654 and the second motor 644 on the basis of a control instruction output from the arithmetic processing unit 661 and outputs an inclination detection result resulting from an arithmetic operation executed by the arithmetic processing unit 661. The first motor 654 rotates the front-rear shaft 65 via the first drive gear 653 and the first driven gear 652. The second motor 644 rotates the left-right shaft 64 via the second drive gear 643 and the second driven gear 642.

The first encoder 655 detects a rotation angle of the first motor 654, i.e., a rotation angle of the front-rear shaft rotated by the first motor 654. The second encoder 645 detects a rotation angle of the second motor 644, i.e., a rotation angle of the left-right shaft 64 rotated by the second motor 644.

The acceleration sensor 631 can detect an inclination change with high responsiveness. The acceleration sensor 631 is capable of acquiring accelerations along three axes perpendicular to each other.

The arithmetic processing unit 661 arithmetically determines the inclination angle and an inclination direction on the basis of a detection result received from the acceleration sensor 631 via the input/output control unit 662, and arithmetically determines a rotation angle of the first encoder 655 and a rotation angle of the second encoder 645 which correspond to the inclination angle and inclination direction arithmetically determined. For example, the arithmetic processing unit 661 uses the following expression to calculate an inclination angle with respect to a horizontal direction on the basis of the detection result received from the acceleration sensor 631.

$$\varphi_{xyz} = \tan^{-1}\left(\frac{G_{py}}{G_{pz}}\right)$$

$$\theta_{xyz} = \tan^{-1}\left(\frac{-G_{px}}{\sqrt{G_{py}^2 + G_{pz}^2}}\right)$$

Math. 1

$\theta_{xyz}, \varphi_{xyz}$: Inclination angle from horizontal direction $G_{px}$: Acceleration along $X$-axis $G_{py}$: Acceleration along $Y$-axis $G_{pz}$: Acceleration along $Z$-axis The inclination sensor 6 is set such that, when the outer frame 61 is horizontally placed, the acceleration sensor 631 detects the horizontal, and is further set such that each of an output from the first encoder 655 and an output from the second encoder 645 represents a reference position (rotation angle 0°).

A description will be given below of operation of the inclination sensor 6.

Figure 3:
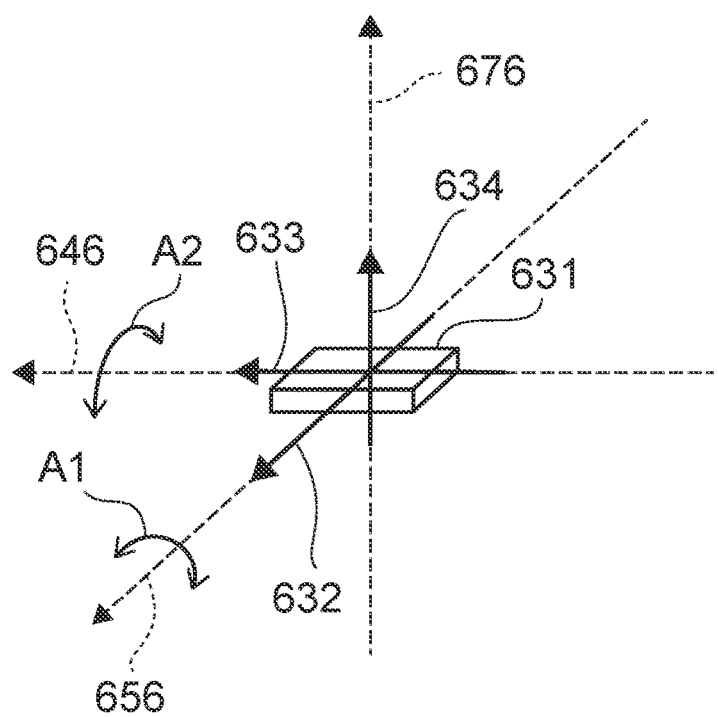
FIG. 3 is a conceptual view illustrating relationships between coordinate axes of an acceleration sensor and shaft centers of rotation shafts of a gimbal mechanism.

FIG. 3 is a conceptual view illustrating relationships between coordinate axes of the acceleration sensor and the shaft centers of the rotation shafts of the gimbal mechanism.

Figure 4A:
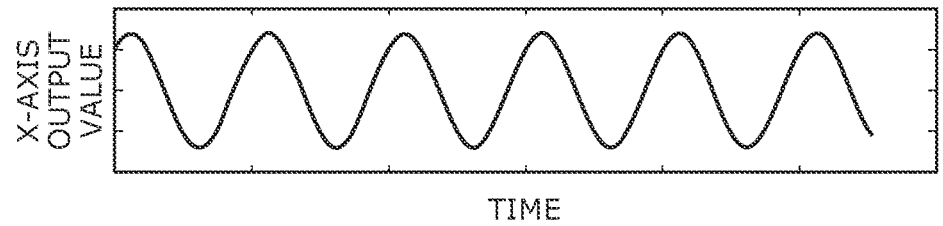
FIGS. 4A to 4C are graphs representing output values from the acceleration sensor in the present embodiment.
Figure 4B:
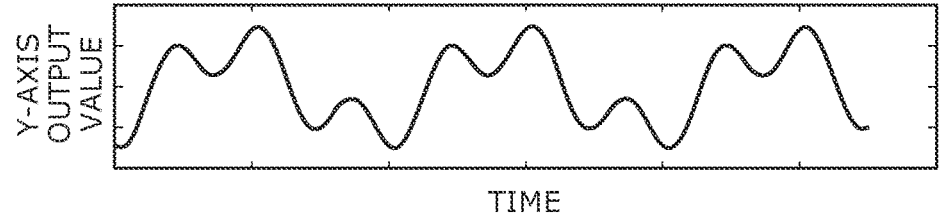
Figure 4C:
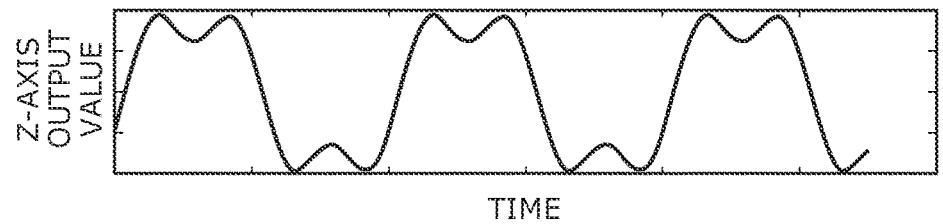

FIGS. 4A to 4C are graphs representing output values from the acceleration sensor according to the present embodiment.

FIGS. 5A to 5C and 6A to 6C are graphs representing output values from an acceleration sensor in a comparative example.

Figure 5A:
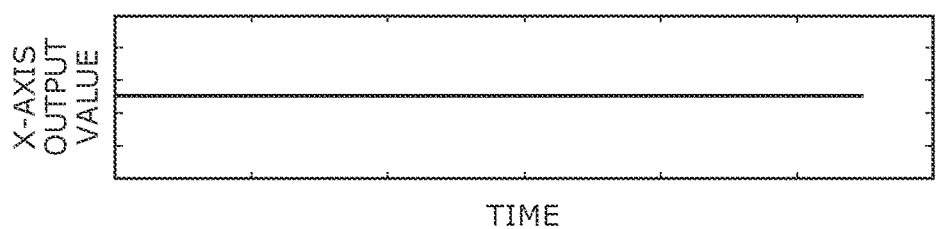
FIGS. 5A to 5C are graphs representing output values from an acceleration sensor in a comparative example.
Figure 5B:
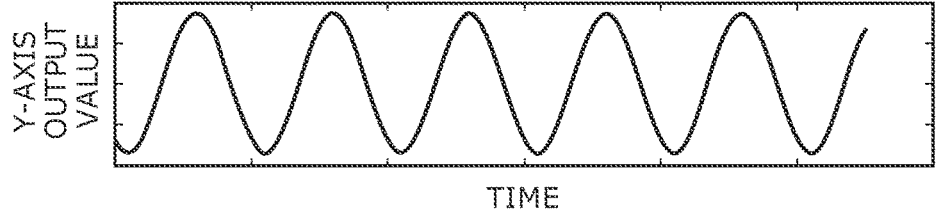
Figure 5C:
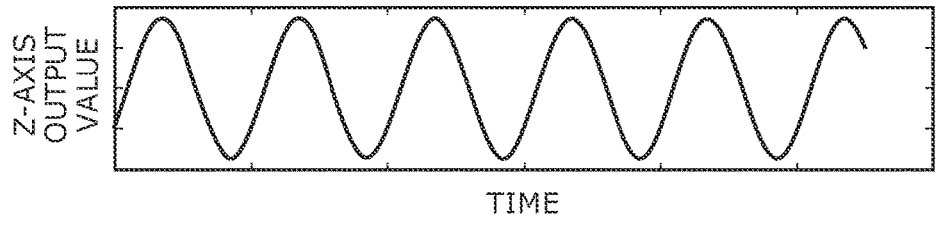
Figure 6A:
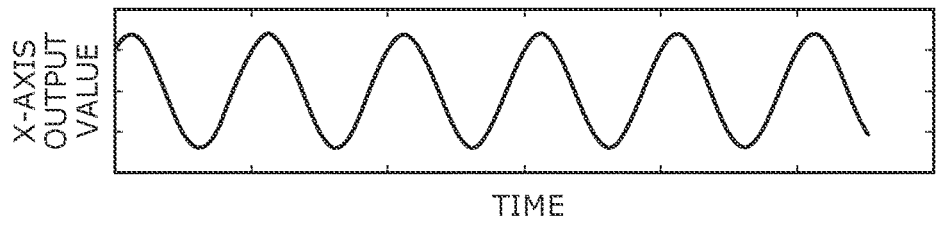
FIGS. 6A to 6C are graphs representing the output values from the acceleration sensor in the comparative example.
Figure 6B:
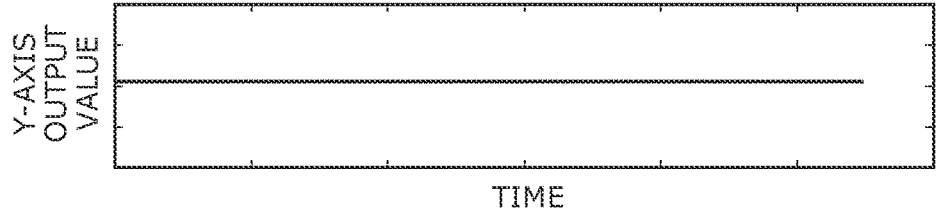
Figure 6C:
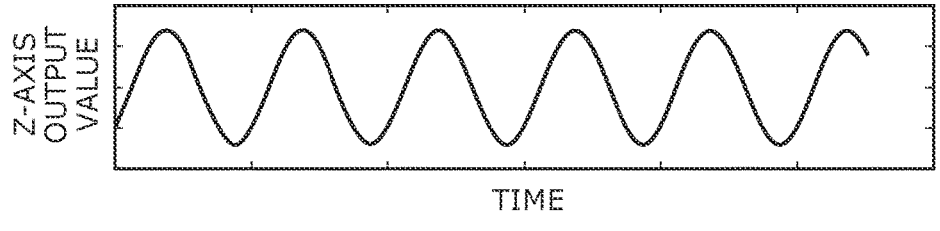

Note that FIGS. 5A to 5C are the graphs representing the output values from the acceleration sensor 631 that rotates only around the front-rear shaft 65. FIGS. 6A to 6C are the graphs representing the output values from the acceleration sensor 631 that rotates only around the left-right shaft 64.

FIGS. 4A, 5A, and 6A are the graphs each representing a relationship between time and an X-axis output value from the acceleration sensor 631. FIGS. 4B, 5B, and 6B are the graphs each representing a relationship between the time and a Y-axis output value from the acceleration sensor 631. FIGS. 4C, 5C, and 6C are the graphs each representing a relationship between the time and a Z-axis output value from the acceleration sensor 631.

First, the relationships between the coordinate axes of the acceleration sensor 631 and the shaft centers (the left-right shaft center 646 and the front-rear shaft center 656) of the rotation shafts (the left-right shaft 64 and the front-rear shaft 65) of the gimbal mechanism 60 will be described with reference to FIG. 3.

The coordinate axes of the acceleration sensor 631 include an X-axis 632, a Y-axis 633, and a Z-axis 634. As illustrated in FIG. 3, the acceleration sensor 631 is disposed in the gimbal mechanism 60 including a mechanism of rotatably supporting the inner frame 62 and a mechanism of rotatably supporting the inclination detection unit 63, while an origin point of the coordinate axes of the acceleration sensor 631 is coincident with a point of intersection of the left-right shaft center 646 of the left-right shaft 64 and the front-rear shaft center 656 of the front-rear shaft 65. This allows the acceleration sensor 631 to rotate around the point of intersection (i.e., the origin point of the gimbal mechanism 60) of the left-right shaft center 646 of the left-right shaft 64 and the front-rear shaft center 656 of the front-rear shaft 65. The X-axis 632 is coincident with the front-rear shaft center 656 of the front-rear shaft 65. The Y-axis 633 is coincident with the left-right shaft center 646 of the left-right shaft 64. The Z-axis 634 is coincident with a vertical shaft center 676.

As indicated by arrows A1 and A2 illustrated in FIG. 3, the control unit 66 (specifically, the input/output control unit 662) simultaneously drives both of the first motor 654 and the second motor 644 to simultaneously rotate both of the front-rear shaft 65 and the left-right shaft 64 and continuously rotate the acceleration sensor 631 around the front-rear shaft 65 and the left-right shaft 64. Then, the control unit 66 (specifically, the arithmetic processing unit 661) applies frequency analysis to the output values from the acceleration sensor 631 to arithmetically determine the inclination angle with respect to the horizontal direction.

Next, the operation of the inclination sensor 6 according to the present embodiment will be further described with reference to FIGS. 4A to 4C, 5A to 5C, and 6A to 6C.

First, referring to FIGS. 5A to 5C, a case where the control unit 66 drives only the first motor 654 to continuously rotate the acceleration sensor 631 only around the front-rear shaft 65 will be described. When the control unit 66 drives only the first motor 654 to continuously rotate the acceleration sensor 631 only around the front-rear shaft 65, the relationships between the time and the output values from the acceleration sensor 631 are exactly as represented by the graphs illustrated in FIGS. 5A to 5C.

In other words, since the acceleration sensor 631 rotates only around the front-rear shaft 65, even when the acceleration sensor 631 continuously rotates, the X-axis 632 of the acceleration sensor 631 remains substantially perpendicular to the gravity direction. Meanwhile, since the acceleration sensor 631 rotates only around the front-rear shaft 65, when the acceleration sensor 631 continuously rotates, the Y-axis 633 and the Z-axis 634 of the acceleration sensor 631 become substantially parallel to the gravity direction, become substantially perpendicular to the gravity direction, and become substantially parallel to a direction opposite to the gravity direction at fixed cycle periods. Accordingly, as illustrated in FIGS. 5A to 5C, an amplitude of the X-axis output value from the acceleration sensor 631 is smaller than each of an amplitude of the Y-axis output value from the acceleration sensor 631 and an amplitude of the Z-axis output value from the acceleration sensor 631. In other words, the amplitude of the Y-axis output value from the acceleration sensor 631 and the amplitude of the Z-axis output value from the acceleration sensor 631 are larger than the amplitude of the X-axis output value from the acceleration sensor 631.

As illustrated in FIG. 5B, the Y-axis output value is maximized when a positive direction of the Y-axis 633 becomes substantially parallel to the gravity direction, is minimized when the positive direction of the Y-axis 633 becomes substantially parallel to the direction opposite to the gravity direction, and reaches a median value when the positive direction of the Y-axis 633 is substantially perpendicular to the gravity direction. In other words, the Y-axis output value is maximized when the positive direction of the Y-axis 633 coincides with the gravity direction, is minimized when the positive direction of the Y-axis 633 coincides with the direction opposite to the gravity direction, and reaches the median value when the positive direction of the Y-axis 633 coincides with the direction perpendicular to the gravity direction. As illustrated in FIG. 5C, the same applies also to the Z-axis output value.

Subsequently, referring to FIGS. 6A to 6C, a case where the control unit 66 drives only the second motor 644 to continuously rotate the acceleration sensor 631 only around the left-right shaft 64 will be described. When the control unit 66 drives only the second motor 644 to continuously rotate the acceleration sensor 631 only around the left-right shaft 64, the relationships between the time and the output values from the acceleration sensor 631 are exactly as represented by the graphs illustrated in FIGS. 6A to 6C.

In other words, since the acceleration sensor 631 rotates only around the left-right shaft 64, even when the acceleration sensor 631 continuously rotates, the Y-axis 633 of the acceleration sensor 631 remains substantially perpendicular to the gravity direction. Meanwhile, since the acceleration sensor 631 rotates only around the left-right shaft 64, when the acceleration sensor 631 continuously rotates, the X-axis 632 of the acceleration sensor 631 and the Z-axis 634 of the acceleration sensor 631 become substantially parallel to the gravity direction, become generally perpendicular to the gravity direction, and become substantially parallel to the direction opposite to the gravity direction at fixed cycle periods. Accordingly, as illustrated in FIGS. 6A to 6C, the amplitude of the Y-axis output value from the acceleration sensor 631 is smaller than the amplitude of the X-axis output value from the acceleration sensor 631 and the amplitude of the Z-axis output value from the acceleration sensor 631. In other words, the amplitude of the X-axis output value from the acceleration sensor 631 and the amplitude of the Z-axis output value from the acceleration sensor 631 are larger than the amplitude of the Y-axis output value from the acceleration sensor 631.

As illustrated in FIG. 6A, the X-axis output value is maximized when the positive direction of the X-axis 632 becomes substantially parallel to the gravity direction, is minimized when the positive direction of the X-axis 632 becomes substantially parallel to the direction opposite to the gravity direction, and reaches a median value when the positive direction of the X-axis 632 is substantially perpendicular to the gravity direction. In other words, the X-axis output value is maximized when the positive direction of the X-axis 632 coincides with the gravity direction, is minimized when the positive direction of the X-axis 632 coincides with the direction opposite to the gravity direction, and reaches the median value when the positive direction of the X-axis 632 coincides with the direction perpendicular to the gravity direction. As illustrated in FIG. 6C, the same applies also to the Z-axis output value.

As described above with reference to FIGS. 5A to 5C, when driving only the first motor 654 to rotate only the front-rear shaft 65, the control unit 66 can prevent the rotation of both of the first motor 654 and the second motor 644 from affecting the individual axes (e.g., the X-axis, the Y-axis, and the Z-axis) of the acceleration sensor 631 and set the Y-axis output value from the acceleration sensor 631 higher than the X-axis output value from the acceleration sensor 631. In addition, as described above with reference to FIGS. 6A to 6C, when driving only the second motor 644 to rotate only the left-right shaft 64, the control unit 66 can prevent the rotation of both of the first motor 654 and the second motor 644 from affecting the individual axes (e.g., the X-axis, the Y-axis, and the Z-axis) of the acceleration sensor 631 and set the X-axis output value from the acceleration sensor 631 higher than the Y-axis output value from the acceleration sensor 631. As a result, the inclination sensor 6 can detect the inclination angle with higher accuracy.

However, when the control unit 66 drives only one of the first motor 654 and the second motor 644 to rotate only one of the front-rear shaft 65 and the left-right shaft 64, there is room for improvement in sensing the inclination angle with respect to the horizontal direction in real time. In other words, when driving only one of the first motor 654 and the second motor 644 to rotate only one of the front-rear shaft 65 and the left-right shaft 64, the control unit 66 is required to determine individually arithmetically the inclination angles with respect to the horizontal direction when only the first motor 654 is driven to rotate only the front-rear shaft 65 and when only the second motor 644 is driven to rotate only the left-right shaft 64. There is also a case where, depending on a data acquisition device in which the inclination sensor 6 is to be used such as a surveying device or an image acquisition device, it may be desired to sense the inclination angle with respect to the horizontal direction in real time. In such a case, when driving only one of the first motor 654 and the second motor 644 to rotate only one of the front-rear shaft 65 and the left-right shaft 64, the control unit 66 is required to determine individually arithmetically the inclination angles with respect to the horizontal direction when only the first motor 654 is driven to rotate only the front-rear shaft 65 and when only the second motor 644 is driven to rotate only the left-right shaft 64. Consequently, there is room for improvement in sensing the inclination angle with respect to the horizontal direction in real time.

By contrast, the control unit 66 of the inclination sensor 6 according to the present embodiment simultaneously drives both of the first motor 654 and the second motor 644 to simultaneously rotate both of the front-rear shaft 65 and the left-right shaft 64 and continuously rotate the acceleration sensor 631 around the front-rear shaft 65 and the left-right shaft 64. In this case, the relationships between the time and the output values from the acceleration sensor 631 are exactly as represented by the graphs illustrated in FIGS. 4A to 4C.

In other words, since the acceleration sensor 631 rotates around the front-rear shaft 65 and the left-right shaft 64, when the acceleration sensor 631 continuously rotates, the X-axis 632, the Y-axis 633, and the Z-axis 634 of the acceleration sensor 631 become substantially parallel to the gravity direction, become substantially perpendicular to the gravity direction, and become substantially parallel to the direction opposite to the gravity direction at fixed cycle periods. Consequently, as illustrated in FIGS. 4A to 4C, extreme values of the output values from the acceleration sensor 631 are affected by both of the rotation angle of the front-rear shaft 65 and the rotation angle of the left-right shaft 64. In other words, the individual axes (e.g., the X-axis, the Y-axis, and the Z-axis) of the acceleration sensor 631 are affected by the rotation of both of the first motor 654 and the second motor 644. In this state, it is difficult for the control unit 66 to deduce the inclination angle with respect to the horizontal direction.

By contrast, the control unit 66 of the inclination sensor 6 according to the present embodiment applies the frequency analysis to the output values (i.e., the X-axis output value, the Y-axis output value, and the Z-axis output value) from the acceleration sensor 631 and thereby arithmetically determines the inclination angle with respect to the horizontal direction.

In the inclination sensor 6 according to the present embodiment, by applying the frequency analysis to the output values from the acceleration sensor 631, the control unit 66 can separate behaviors of the individual axes (e.g., the X-axis, the Y-axis, and the Z-axis) of the acceleration sensor 631 when the first motor 654 is rotated from behaviors of the individual axes (e.g., the X-axis, the Y-axis, and the Z-axis) of the acceleration sensor 631 when the second motor 644 rotates and ensure the accuracy of detecting the inclination angle with respect to the horizontal direction. In other words, by driving the first motor 654 and the second motor 644 to simultaneously rotate the front-rear shaft 65 and the left-right shaft 64 and applying the frequency analysis to the output values from the acceleration sensor 631, the control unit 66 can arithmetically determine the inclination angle with respect to the horizontal direction instead of, e.g., driving only the first motor 654 to rotate only the front-rear shaft 65 or driving only the second motor 644 to rotate only the left-right shaft 64. Accordingly, the control unit 66 need not individually arithmetically determine the inclination angles with respect to the horizontal direction when only the front-rear shaft 65 is rotated and when only the left-right shaft 64 is rotated, and can arithmetically determine the inclination angle with respect to the horizontal direction by simultaneously rotating the front-rear shaft 65 and the left-right shaft 64. This allows the inclination sensor 6 according to the present embodiment to sense the inclination angle with respect to the horizontal direction in real time.

When the acceleration sensor is affected by a change in environment such as a temperature, an atmospheric pressure, a humidity, or a magnetic field, drift may occur in the output values from the acceleration sensor. Otherwise, when the acceleration sensor continues to be affected by a change in environment, the output values from the acceleration sensor may change with time to cause drift in the output values from the acceleration sensor.

By contrast, the control unit 66 of the inclination sensor 6 according to the present embodiment arithmetically determines the inclination angle with respect to the horizontal direction not on the basis of the output values from the acceleration sensor 631, but on the basis of a result of applying the frequency analysis to the output values from the acceleration sensor 631. Thus, the control unit 66 can arithmetically determine the inclination angle with respect to the horizontal direction by applying the frequency analysis to the output values from the acceleration sensor 631 instead of acquiring high-accuracy output values from the acceleration sensor 631. This allows the inclination sensor 6 according to the present embodiment to ensure the accuracy of detecting the inclination angle with respect to the horizontal direction by using the frequency analysis even when drift occurs in the output values from the acceleration sensor 631. In addition, since there is no need for a tilt sensor capable of high-accuracy detection or the like, it is possible to reduce a size of the inclination sensor 6.

There is a case where an acceleration change dependent on control cycle periods of the first motor 654 and the second motor 644, an acceleration change due to the effect of cogging torques of the first motor 654 and the second motor 644, or the like is included in the output values from the acceleration sensor 631.

By contrast, in the inclination sensor 6 according to the present embodiment, by matching the sampling cycle period of the acceleration sensor 631 with each of the control cycle periods of the first motor 654 and the second motor 644 and thereby setting an average value of acceleration changes due to the effect of an acceleration that depends on the control cycle period when the frequency analysis is applied and the cogging torques to 0, it is possible to detect the inclination angle with higher accuracy.

Note that the control unit 66 may also control the driving of the first motor 654 and the second motor 644 and rotate the front-rear shaft 65 and the left-right shaft 64 at a given speed or rotate the front-rear shaft 65 and the left-right shaft 64 at a variable speed. When rotating the front-rear shaft 65 and the left-right shaft 64 at a given speed, the control unit 66 can prevent an acceleration other than the acceleration due to the gravity from being generated in the acceleration sensor 631. In addition, as illustrated in FIGS. 4A to 4C, the control unit 66 fits at least one of the X-axis output value and the Y-axis output value to a sine wave, and can calculate the inclination angle in a state where noise is reduced. As a result, when the control unit 66 rotates the front-rear shaft 65 and the left-right shaft 64 at a given speed, the inclination sensor 6 according to the present embodiment can detect the inclination angle with higher accuracy. Note that the control unit 66 sets rotation speeds of the front-rear shaft 65 and the left-right shaft 64 to, e.g., about 20 rps or lower. However, the rotation speeds of the front-rear shaft 65 and the left-right shaft 64 are not limited to 20 rps or lower. The control unit 66 may also rotate the front-rear shaft 65 and the left-right shaft 64 at the same speed or at different speeds.

Next, a specific operation of the inclination sensor 6 according to the present embodiment will be further described with reference to the drawings.

FIGS. 7A to 7C are graphs illustrating timing at which the control unit in the present embodiment acquires the output values from the acceleration sensor.

Figure 8A:
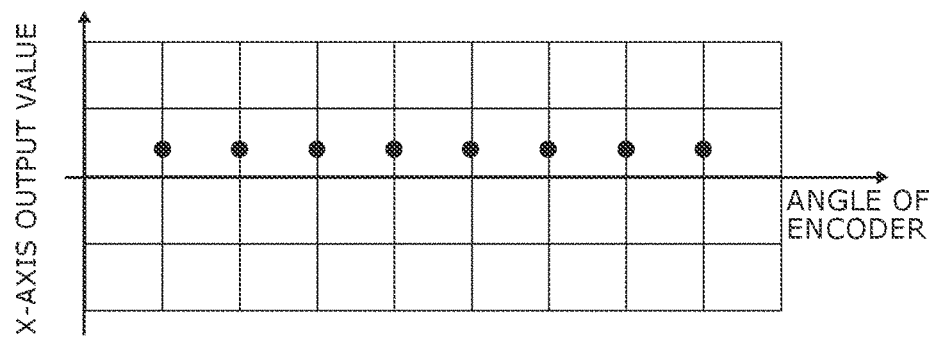
FIGS. 8A to 8C are graphs representing sampling of the output values from the acceleration sensor acquired by the control unit in the present embodiment.
Figure 8B:
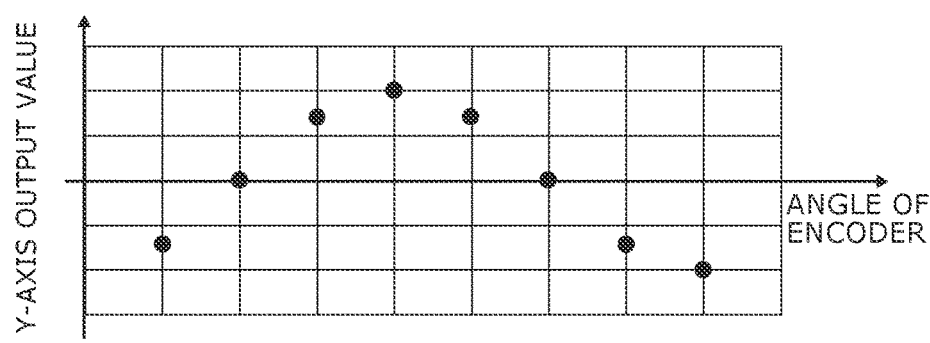
Figure 8C:
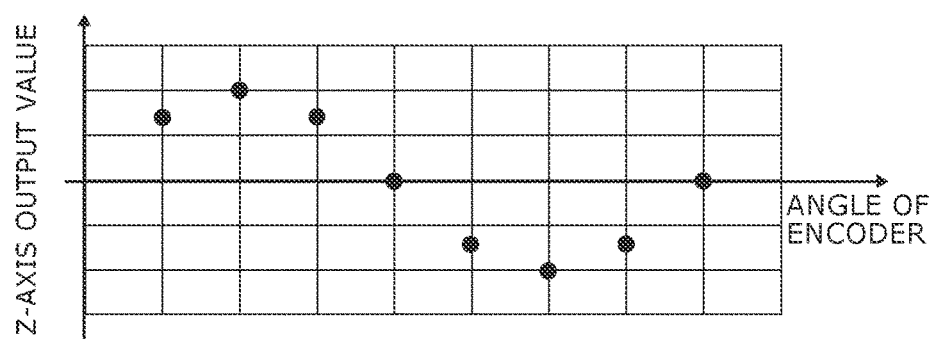

FIGS. 8A to 8C are graphs representing sampling of the output values from the acceleration sensor acquired by the control unit in the present embodiment.

Figure 9A:
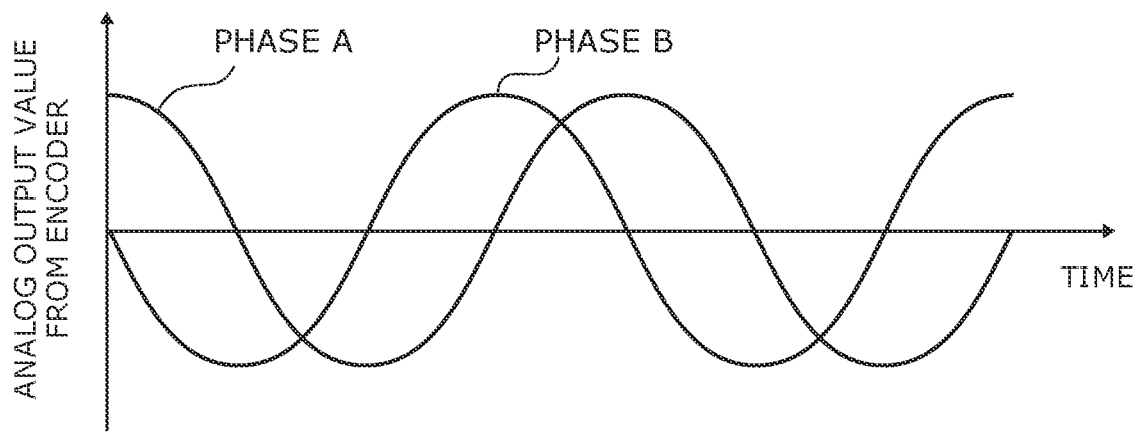
FIGS. 9A and 9B are graphs illustrating sampling of an analog output value from an encoder.
Figure 9B:
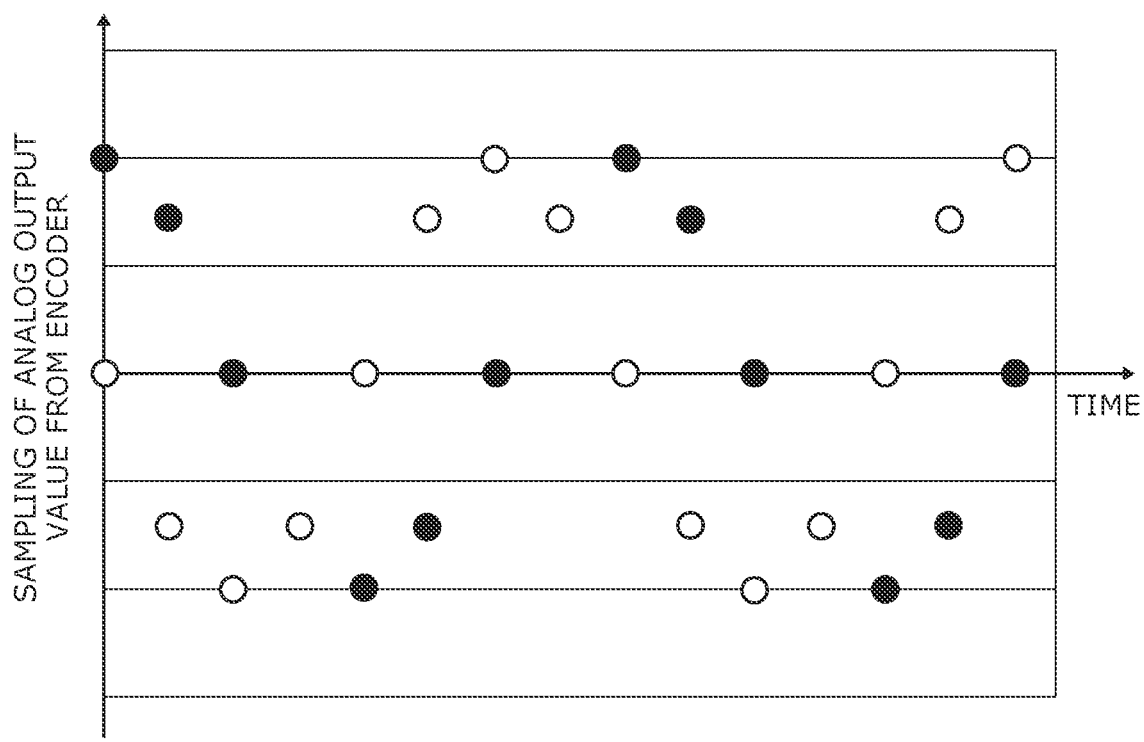

FIGS. 9A and 9B are graphs illustrating sampling of an analog output value from an encoder.

Note that FIG. 7A is the graph representing a relationship between time and an output signal from the encoder in the present embodiment. FIG. 7B is a graph representing a relationship between the time and the output values from the acceleration sensor 631. FIG. 7C is a graph representing a relationship between an angle of the encoder in the present embodiment and sampling of the output values from the acceleration sensor 631.

FIG. 8A is the graph representing a relationship between an angle of the encoder and the X-axis output value from the acceleration sensor 631. FIG. 8B is the graph representing a relationship between the angle of the encoder and the Y-axis output value from the acceleration sensor 631. FIG. 8C is the graph representing a relationship between the angle of the encoder and the Z-axis output value from the acceleration sensor 631.

The "ENCODER" illustrated in each of FIGS. 7A, 7C and 8A to 8C is at least one of the first encoder 655 and the second encoder 645.

The control unit 66 in the present embodiment acquires the output values from the acceleration sensor 631 at timing at which the angle of the encoder exhibits a predetermined angle. In other words, the control unit 66 in the present embodiment executes sampling of the output values from the acceleration sensor 631 at each given angle of the encoder. Then, the control unit 66 performs control to synchronize the angle of the encoder with the output values from the acceleration sensor 631.

For example, as illustrated in FIG. 7A, in a case where the encoder is the increment-type rotary encoder, an output signal from the encoder presents a square wave. In this case, as illustrated in FIG. 7B, the control unit 66 acquires the output values from the acceleration sensor 631 at timing at which the output signal from the encoder rises (a shift from OFF (dark) to ON (bright)) and at timing at which the output signal from the encoder falls (a shift from ON (bright) to OFF (dark)). In other words, the control unit 66 senses, on the basis of the output signal from the encoder, the timing at which the output values from the acceleration sensor 631 are to be acquired, and acquires the output values from the acceleration sensor 631 at that timing. Consequently, as illustrated in FIG. 7C, the control unit 66 can derive the relationships between the angle of the encoder and the output values from the acceleration sensor 631, i.e., the output values from the acceleration sensor 631 with respect to the angle of the encoder. Then, the control unit 66 performs control to synchronize the angle of the encoder with the output values from the acceleration sensor 631.

Specifically, as illustrated in FIG. 8A, the control unit 66 acquires the X-axis output value from the acceleration sensor 631 at the timing at which the angle of the encoder exhibits the predetermined angle, and synchronizes the angle of the encoder with the X-axis output value from the acceleration sensor 631. Also, as illustrated in FIG. 8B, the control unit 66 acquires the Y-axis output value from the acceleration sensor 631 at the timing at which the angle of the encoder exhibits the predetermined angle, and synchronizes the angle of the encoder with the Y-axis output value from the acceleration sensor 631. Also, as illustrated in FIG. 8C, the control unit 66 acquires the Z-axis output value from the acceleration sensor 631 at the timing at which the angle of the encoder exhibits the predetermined angle, and synchronizes the angle of the encoder with the Z-axis output value from the acceleration sensor 631.

In the graph illustrated in FIGS. 8A to 8C, for the convenience of illustration, a case where the acceleration sensor 631 rotates around the front-rear shaft 65 having the front-rear shaft center 656 coincident with the X-axis 632 is illustrated by way of example. However, as described above with reference to FIGS. 3 and 4A to 4C, in the inclination sensor 6 according to the present embodiment, both of the front-rear shaft 65 and the left-right shaft 64 simultaneously rotate, and the acceleration sensor 631 rotates around the front-rear shaft 65 and the left-right shaft 64.

In the example of the graph illustrated in FIG. 8A, the control unit 66 acquires the X-axis output value from the acceleration sensor 631 at timing at which the rotation angle of the front-rear shaft 65 detected by the first encoder 655 exhibits a predetermined angle, and synchronizes the rotation angle of the front-rear shaft 65 with the X-axis output value from the acceleration sensor 631. In the example of the graph illustrated in FIG. 8B, the control unit 66 acquires the Y-axis output value from the acceleration sensor 631 at the timing at which the rotation angle of the front-rear shaft 65 detected by the first encoder 655 exhibits a predetermined angle, and synchronizes the rotation angle of the front-rear shaft 65 with the Y-axis output value from the acceleration sensor 631. In the example of the graph illustrated in FIG. 8C, the control unit 66 acquires the Z-axis output value from the acceleration sensor 631 at the timing at which the rotation angle of the front-rear shaft 65 detected by the first encoder 655 exhibits a predetermined angle, and synchronizes the rotation angle of the front-rear shaft 65 with the Z-axis output value from the acceleration sensor 631.

The control unit 66 in the present embodiment matches at least one of the control cycle period of the first motor 654 and the control cycle period of the second motor 644 with each of time intervals (i.e., a sampling interval or a sampling cycle period) at which the output values from the acceleration sensor 631 are acquired. In each of the examples of the graphs illustrated in FIGS. 7A to 7C and 8A to 8C, the control unit 66 acquires the output values from the acceleration sensor 631 at timing at which the angle of the first encoder 655 (i.e., the rotation angle of the front-rear shaft 65) exhibits values corresponding to multiples of 45 degrees, and synchronizes the angle of the first encoder 655 with the output values from the acceleration sensor 631. Note that the timing at which the control unit 66 acquires the output values from the acceleration sensor 631 is not limited only thereto. For example, the control unit 66 may also acquire $2^l$ ($l \in N$) output values from the acceleration sensor 631 at timing at which the angle of the encoder exhibits $360/2^k$ [deg] ($k \in N$).

In the graph illustrated in FIG. 7A, the output from the encoder is a digital output (rectangular wave) after A/D conversion. However, the output from the encoder is not limited only thereto. For example, the control unit 66 may also sample an analog output value from an encoder as illustrated in FIG. 9A at timing at which the angle of the encoder exhibits the values corresponding to the multiples of 45 degrees as illustrated in FIG. 9B and perform interpolation between individual measurement points as required. This allows the encoder to have a high resolution or an intended resolution. Note that timing at which the analog output value from the encoder is sampled is not limited to the timing at which the angle of the encoder exhibits the values corresponding to the multiples of 45 degrees.

As described above, in the graphs illustrated in FIGS. 8A to 8C, for the convenience of illustration, the case where the acceleration sensor 631 rotates around the front-rear shaft 65 having the front-rear shaft center 656 coincident with the X-axis 632 is illustrated by way of example. The description related to FIGS. 8A to 8C also similarly applies to a case where the acceleration sensor 631 rotates around the left-right shaft 64 having the left-right shaft center 646 coincident with the Y-axis 633. Then, the control unit 66 arithmetically determines the inclination angle with respect to the horizontal direction on the basis of a phase of the encoder when the frequency analysis is applied to the output values from the acceleration sensor 631 acquired at the timing described with reference to FIGS. 7A to 7C and 8A to 8C. A further description will be given thereof with reference to the drawings.

Figure 10A:
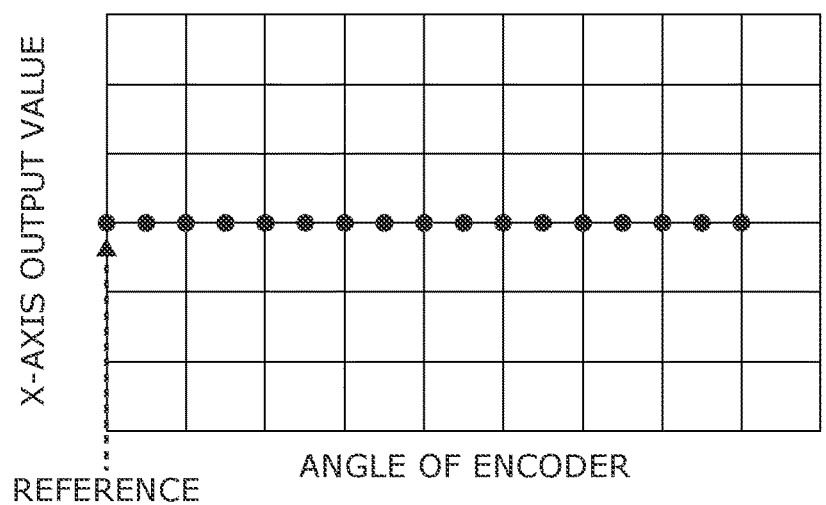
FIGS. 10A to 10C are graphs illustrating a first example of the sampling of the output values from the acceleration sensor acquired by the control unit in the present embodiment.
Figure 10B:
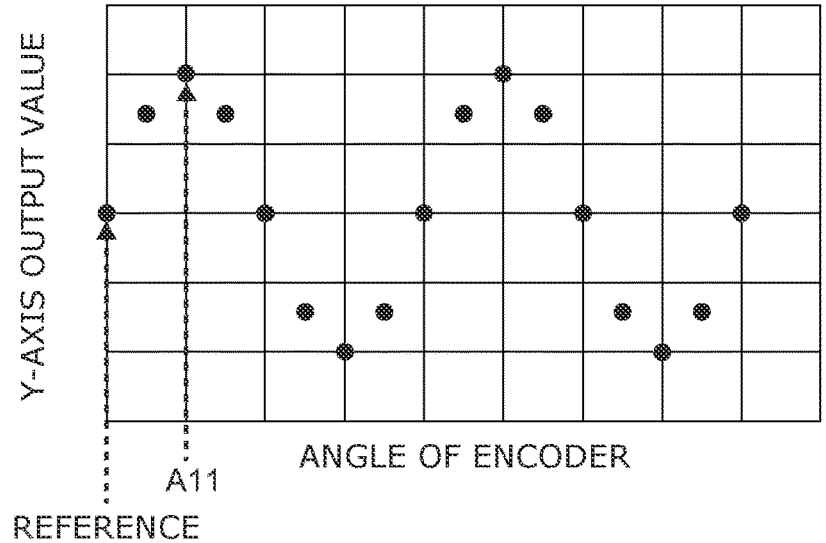
Figure 10C:
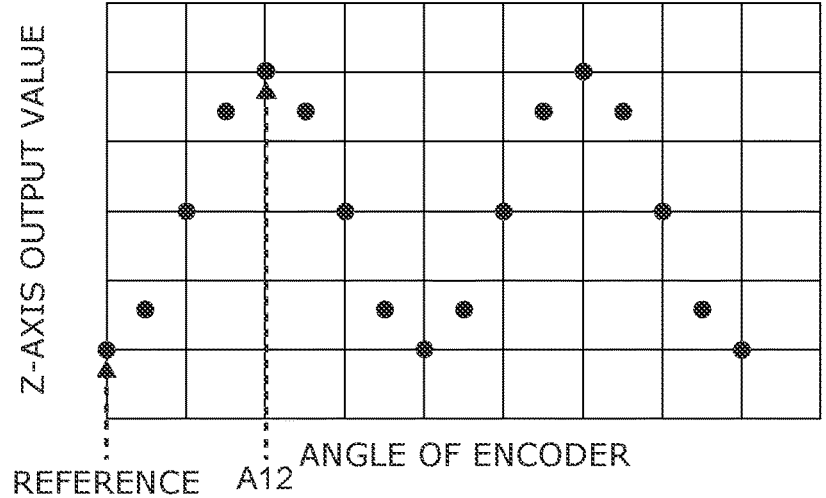

FIGS. 10A to 10C are graphs each illustrating a first example of the sampling of the output values from the acceleration sensor acquired by the control unit in the present embodiment.

Figure 11:
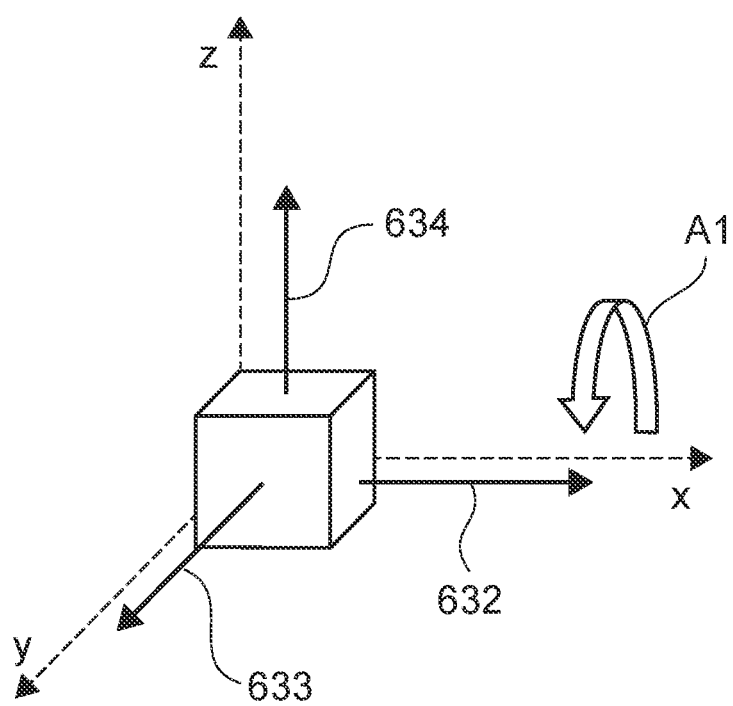
FIG. 11 is a schematic diagram illustrating a case where a Z-axis of the acceleration sensor is parallel to a vertical axis.

FIG. 11 is a schematic diagram illustrating a case where the Z-axis of the acceleration sensor is parallel to a vertical axis.

Note that the z-axis illustrated in FIG. 11 is a vertical axis. The x-axis illustrated in FIG. 11 is one of axes perpendicular to the vertical axis. The y-axis illustrated in FIG. 11 is perpendicular to each of the z-axis (vertical axis) and the x-axis.

For the convenience of description, the acceleration sensor 631 illustrated in FIG. 11 rotates around the front-rear shaft 65 having the front-rear shaft center 656 coincident with the X-axis 632. However, as described above with reference to FIGS. 3 and 4A to 4C, in the inclination sensor 6 according to the present embodiment, both of the front-rear shaft 65 and the left-right shaft 64 simultaneously rotate, and the acceleration sensor 631 rotates around the front-rear shaft 65 and the left-right shaft 64.

As described above with reference to FIGS. 7A to 7C and 8A to 8C, the control unit 66 acquires the X-axis output value from the acceleration sensor 631 at the timing at which the rotation angle of the front-rear shaft 65 detected by the first encoder 655 exhibits the predetermined angle, and synchronizes the rotation angle of the front-rear shaft 65 with the X-axis output value from the acceleration sensor 631. This result is exactly as represented by the graph illustrated in FIG. 10A. The control unit 66 also acquires the Y-axis output value from the acceleration sensor 631 at the timing at which the rotation angle of the front-rear shaft 65 detected by the first encoder 655 exhibits the predetermined angle, and synchronizes the rotation angle of the front-rear shaft 65 with the Y-axis output value from the acceleration sensor 631. This result is exactly as represented by the graph illustrated in FIG. 10B. The control unit 66 also acquires the Z-axis output value from the acceleration sensor 631 at the timing at which the rotation angle of the front-rear shaft 65 detected by the first encoder 655 exhibits the predetermined angle, and synchronizes the rotation angle of the front-rear shaft 65 with the Z-axis output value from the acceleration sensor 631. This result is exactly as represented by the graph illustrated in FIG. 10C.

In the example of the graphs illustrated in FIGS. 10A to 10C, a slit disc of the first encoder 655 has four or more slits provided at equal intervals. Accordingly, the control unit 66 acquires the output values from the acceleration sensor 631 at timing at which the angle of the first encoder 655 (i.e., the rotation angle of the front-rear shaft 65) exhibits the values corresponding to the multiples of 45 degrees, and synchronizes the angle of the first encoder 655 with the output values from the acceleration sensor 631.

For example, when the slit disc of the encoder has N slits, an angle of the i-th slit when viewed from a reference position (rotation angle 0°) is represented by 360i/N. Accordingly, in the example of the graph illustrated in FIG. 10B, an angle A11 of the first encoder 655 (i.e., the rotation angle of the front-rear shaft 65) when the Y-axis output value from the acceleration sensor 631 is maximal is 90 degrees when viewed from the reference position. Meanwhile, in the example of the graph illustrated in FIG. 10C, an angle A12 of the first encoder 655 (i.e., the rotation angle of the front-rear shaft 65) when the Z-axis output value from the acceleration sensor 631 is maximal is 180 degrees when viewed from the reference position.

Then, the control unit 66 arithmetically determines the inclination angle with respect to the horizontal direction on the basis of a phase of the first encoder 655 (i.e., the rotation angle of the front-rear shaft 65 from the reference position) when the frequency analysis is applied to the X-axis output value, the Y-axis output value, and the Z-axis output value from the acceleration sensor 631 illustrated in FIGS. 10A to 10C.

Note that, as described above, in FIGS. 10A to 10C and FIG. 11, for the convenience of illustration, the case where the acceleration sensor 631 rotates around the front-rear shaft 65 having the front-rear shaft center 656 coincident with the X-axis 632 is illustrated by way of example. The description related to FIGS. 10A to 10C and 11 similarly applies also to the case where the acceleration sensor 631 rotates around the left-right shaft 64 having the left-right shaft center 646 coincident with the Y-axis 633.

Figures 12A, 12B, 12C:
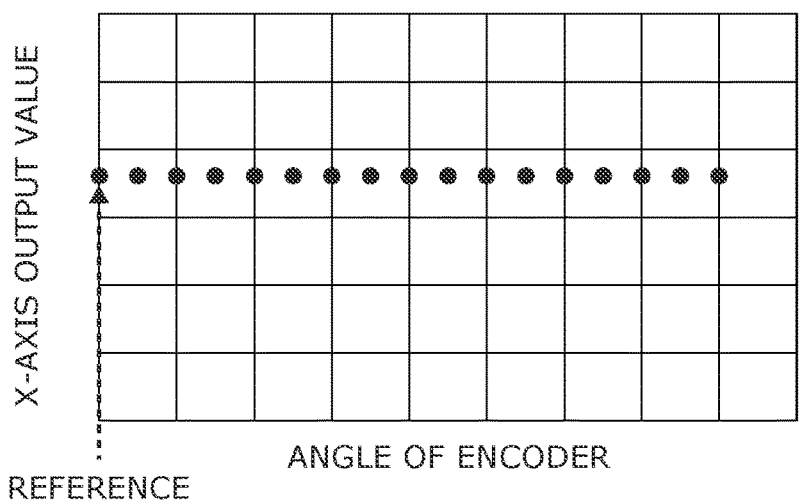
FIGS. 12A to 12C are graphs illustrating a second example of the sampling of the output values from the acceleration sensor acquired by the control unit in the present embodiment.

FIGS. 12A to 12C are graphs illustrating a second example of the sampling of the output values from the acceleration sensor acquired by the control unit in the present embodiment.

Figure 13:
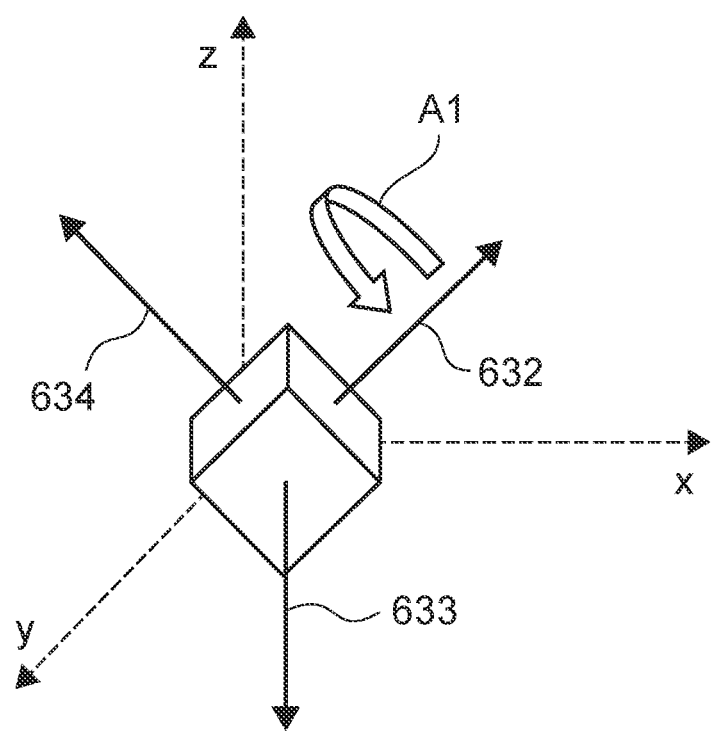
FIG. 13 is a schematic diagram illustrating a case where the Z-axis of the acceleration sensor is inclined from the vertical axis.

FIG. 13 is a schematic diagram illustrating a case where the Z-axis of the acceleration sensor is inclined from the vertical axis.

Note that the x-axis, y-axis, and z-axis illustrated in FIG. 13 are as described above with reference to FIG. 11.

For the convenience of description, the acceleration sensor 631 illustrated in FIG. 13 rotates around the front-rear shaft 65 having the front-rear shaft center 656 coincident with the X-axis 632. However, as described above with reference to FIGS. 3 and 4A to 4C, in the inclination sensor 6 according to the present embodiment, both of the front-rear shaft 65 and the left-right shaft 64 simultaneously rotate, and the acceleration sensor 631 rotates around the front-rear shaft 65 and the left-right shaft 64.

As described above with reference to FIGS. 7A to 7C and 8A to 8C, the control unit 66 acquires the X-axis output value from the acceleration sensor 631 at the timing at which the rotation angle of the front-rear shaft 65 detected by the first encoder 655 exhibits the predetermined angle, and synchronizes the rotation angle of the front-rear shaft 65 with the X-axis output value from the acceleration sensor 631. This result is exactly as represented by the graph illustrated in FIG. 12A. The control unit 66 also acquires the Y-axis output value from the acceleration sensor 631 at the timing at which the rotation angle of the front-rear shaft 65 detected by the first encoder 655 exhibits the predetermined angle, and synchronizes the rotation angle of the front-rear shaft 65 with the Y-axis output value from the acceleration sensor 631. This result is exactly as represented by the graph illustrated in FIG. 12B. The control unit 66 also acquires the Z-axis output value from the acceleration sensor 631 at the timing at which the rotation angle of the front-rear shaft 65 detected by the first encoder 655 exhibits the predetermined angle, and synchronizes the rotation angle of the front-rear shaft 65 with the Z-axis output value from the acceleration sensor 631. This result is exactly as represented by the graph illustrated in FIG. 12C.

In the example of the graph illustrated in FIGS. 12A to 12C, the slit disc of the first encoder 655 has the four or more slits provided at the equal intervals. Accordingly, the control unit 66 acquires the output values from the acceleration sensor 631 at the timing at which the angle of the first encoder 655 (i.e., the rotation angle of the front-rear shaft 65) exhibits the values corresponding to the multiples of 45 degrees, and synchronizes the angle of the first encoder 655 with the output values from the acceleration sensor 631.

In the example of the graph illustrated in FIG. 12B, an angle A13 of the first encoder 655 (i.e., the rotation angle of the front-rear shaft 65) when the Y-axis output value from the acceleration sensor 631 is maximal is 45 degrees when viewed from the reference position. Meanwhile, in the example of the graph illustrated in FIG. 12C, an angle A14 of the first encoder 655 (i.e., the rotation angle of the front-rear shaft 65) when the Z-axis output value from the acceleration sensor 631 is maximal is 135 degrees when viewed from the reference position.

Then, the control unit 66 arithmetically determines the inclination angle with respect to the horizontal direction on the basis of the phase of the first encoder 655 (i.e., the rotation angle of the front-rear shaft 65 from the reference position) when the frequency analysis is applied to the X-axis output value, the Y-axis output value, and the Z-axis output value from the acceleration sensor 631 illustrated in FIGS. 12A to 12C.

Note that, as described above, in FIGS. 12A to 12C and 13, for the convenience of illustration, the case where the acceleration sensor 631 rotates around the front-rear shaft 65 having the front-rear shaft center 656 coincident with the X-axis 632 is illustrated by way of example. The description related to FIGS. 12A to 12C and 13 similarly applies also to the case where the acceleration sensor 631 rotates around the left-right shaft 64 having the left-right shaft center 646 coincident with the Y-axis 633.

As described above, in the inclination sensor 6 according to the present embodiment, the control unit 66 arithmetically determines the inclination angle with respect to the horizontal direction on the basis of at least one of the rotation angle of the front-rear shaft 65 from the reference position that has been detected by the first encoder 655 and the rotation angle of the left-right shaft 64 from the reference position that has been detected by the second encoder 645 when the frequency analysis is applied to the output values from the acceleration sensor 631. In other words, the control unit 66 arithmetically determines the inclination angle with respect to the horizontal direction on the basis of at least one of the phase of the first encoder 655 and a phase of the second encoder 645 when the frequency analysis is applied to the output values from the acceleration sensor 631. This allows the inclination sensor 6 according to the present embodiment to ensure the accuracy of detecting the inclination angle with respect to the horizontal direction and also sense the inclination angle with respect to the horizontal direction in real time.

The control unit 66 also synchronizes at least one of the rotation angle of the front-rear shaft 65 and the rotation angle of the left-right shaft 64 with the output values from the acceleration sensor 631. This can prevent a relationship between timing at which the acceleration sensor 631 exhibits predetermined output values and each of the rotation angle of the front-rear shaft 65 and the rotation angle of the left-right shaft 64 at that timing from varying. In addition, the control unit 66 acquires the output values from the acceleration sensor 631 at the timing at which at least one of the rotation angle of the front-rear shaft 65 detected by the first encoder 655 and the rotation angle of the left-right shaft 64 detected by the second encoder 645 exhibits the predetermined angle. In other words, the control unit 66 executes sampling of the output values from the acceleration sensor 631 not at fixed time intervals, but at each given angle of at least one of the first encoder 655 and the second encoder 645. As a result, even in a case where, when, e.g., the acceleration sensor 631 rotates, at least one of the first motor 654 and the second motor 644 is accelerated or decelerated due to imbalance of a rotating body such as the acceleration sensor 631 or the gimbal mechanism 60, it is possible to more reliably prevent the relationship between the timing at which the acceleration sensor 631 exhibits the predetermined output values and each of the rotation angle of the front-rear shaft 65 and the rotation angle of the left-right shaft 64 at that timing from varying, and more reliably synchronize at least one of the rotation angle of the front-rear shaft 65 and the rotation angle of the left-right shaft 64 with the output values from the acceleration sensor 631.

The control unit 66 also senses timing at which the output values from the acceleration sensor 631 are to be acquired on the basis of at least one of an output signal from the first encoder 655 and an output signal from the second encoder 645, and acquires the output values from the acceleration sensor 631 at that timing. In other words, the control unit 66 uses at least one of the output signal from the first encoder 655 and the output signal from the second encoder 645 as a trigger to acquire the output values from the acceleration sensor 631, and synchronizes at least one of the rotation angle of the front-rear shaft 65 and the rotation angle of the left-right shaft 64 with the output values from the acceleration sensor 631. As a result, it is possible to more reliably prevent the relationship between the timing at which the acceleration sensor 631 exhibits the predetermined output values and each of the rotation angle of the front-rear shaft 65 and the rotation angle of the left-right shaft 64 at that timing from varying and more reliably synchronize at least one of the rotation angle of the front-rear shaft 65 and the rotation angle of the left-right shaft 64 with the output values from the acceleration sensor 631.

The control unit 66 also matches at least one of the control cycle period of the first motor 654 and the control cycle period of the second motor 644 with each of the time intervals at which the output values from the acceleration sensor 631 are acquired. As a result, even when at least one of the first motor 654 and the second motor 644 is periodically accelerated or decelerated, it is possible to prevent the periodic acceleration or deceleration of the first motor 654 and the second motor 644 from affecting the output values from the acceleration sensor 631. This allows the inclination sensor 6 according to the present embodiment to detect the inclination angle with higher accuracy.

Next, a self-calibration function of the inclination sensor according to the present embodiment will be described with reference to the drawings.

Figure 14A:
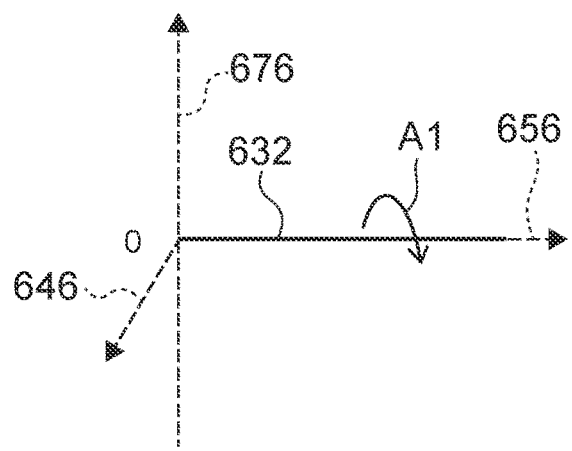
FIGS. 14A to 14C are schematic diagrams illustrating an example of a trajectory of an X-axis of the acceleration sensor in the present embodiment.
Figure 14B:
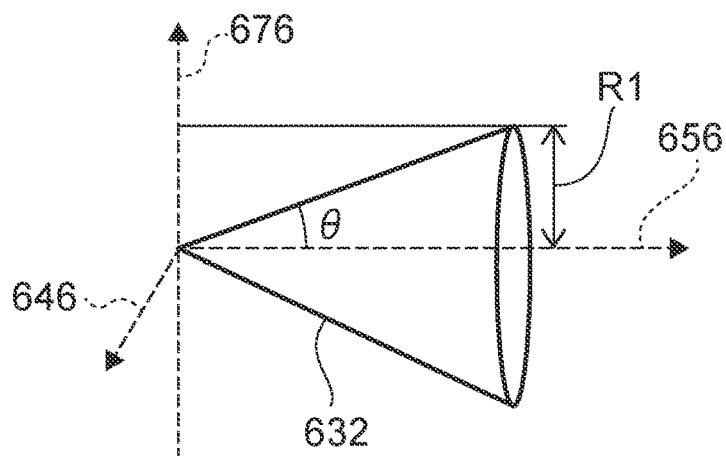
Figure 14C:
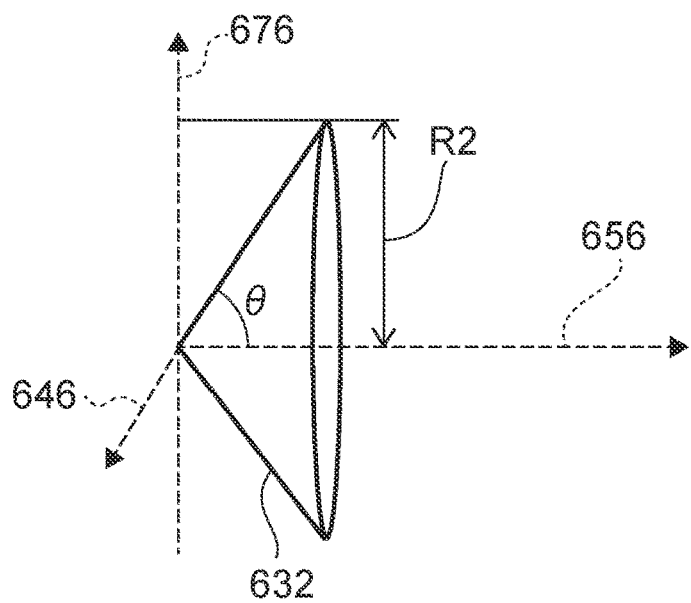

FIGS. 14A to 14C are schematic diagrams illustrating an example of a trajectory of the X-axis of the acceleration sensor in the present embodiment.

The inclination sensor 6 according to the present embodiment has the self-calibration function of calculating an axial runout (i.e., an angle misalignment between axes) between the front-rear shaft center 656 of the front-rear shaft 65 and the X-axis 632 of the acceleration sensor 631.

In other words, when performing the self-calibration function for the axial runout, the control unit 66 drives the first motor 654 to rotate the front-rear shaft 65 by 360 degrees or more, as indicated by an arrow A1 illustrated in FIG. 14A, and thereby rotate the acceleration sensor 631 around the front-rear shaft 65 by 360 degrees or more. When there is an axial runout between the front-rear shaft center 656 of the front-rear shaft 65 and the X-axis 632 of the acceleration sensor 631, the trajectory of the X-axis 632 of the acceleration sensor 631 is exactly as illustrated in FIG. 14B or FIG. 14C. In an example illustrated in FIG. 14B, an angle θ between the trajectory of the X-axis 632 of the acceleration sensor 631 and the front-rear shaft center 656 of the front-rear shaft 65 is larger than 0 degrees and smaller than 45 degrees. In an example illustrated in FIG. 14C, the angle θ between the trajectory of the X-axis 632 of the acceleration sensor 631 and the front-rear shaft center 656 of the front-rear shaft 65 is 45 degrees.

As axial runouts R1 and R2 between the front-rear shaft center 656 of the front-rear shaft 65 and the X-axis 632 of the acceleration sensor 631 are relatively larger, amplitudes of the output values from the acceleration sensor 631 are relatively larger. Accordingly, the control unit 66 drives the first motor 654 to rotate the front-rear shaft 65 by 360 degrees or more and rotate the acceleration sensor 631 by 360 degrees or more around the front-rear shaft 65, and acquires the amplitudes of the output values from the acceleration sensor 631. Thus, the control unit 66 can calculate the axial runouts R1 and R2 between the front-rear shaft center 656 of the front-rear shaft 65 and the X-axis 632 of the acceleration sensor 631.

Note that, by driving the second motor 644, the control unit 66 can rotate the left-right shaft 64 by 360 degrees or more and rotate the acceleration sensor 631 by 360 degrees or more around the left-right shaft 64. In this case, by acquiring the amplitudes of the output values from the acceleration sensor 631, the control unit 66 can calculate an axial runout between the left-right shaft center 646 of the left-right shaft 64 and the Y-axis 633 of the acceleration sensor 631.

The inclination sensor 6 according to the present embodiment also has a self-calibration function of calculating a centrifugal force generated in the acceleration sensor 631.

In other words, the control unit 66 arithmetically determines a rotation speed of the front-rear shaft 65 on the basis of the rotation angle of the front-rear shaft 65 detected by the first encoder 655. The control unit 66 also arithmetically determines the rotation speed of the left-right shaft 64 on the basis of the rotation angle of the left-right shaft 64 detected by the second encoder 645. Then, the control unit 66 arithmetically determines the centrifugal force generated in the acceleration sensor 631. The control unit 66 further executes an arithmetic operation to remove, from the output values from the acceleration sensor 631, the centrifugal force generated in the acceleration sensor 631 that has been arithmetically determined. In other words, the control unit 66 executes the arithmetic operation to remove a component related to the centrifugal force that is included in the output values from the acceleration sensor 631.

As a result, even in a case where an acceleration due to the effect of a centrifugal force generated in the acceleration sensor 631 when, e.g., the front-rear shaft 65 and the left-right shaft 64 rotate at given speeds, a centrifugal force generated in the acceleration sensor 631 when the X-axis 632 of the acceleration sensor 631 is not coincident with the front-rear shaft center 656 of the front-rear shaft 65 and when the Y-axis 633 of the acceleration sensor 631 is not coincident with the left-right shaft center 646 of the left-right shaft 64, or the like is included in the output values from the acceleration sensor 631, the control unit 66 can execute the arithmetic operation to remove the component related to the centrifugal force that is included in the output values from the acceleration sensor 631. This allows the inclination sensor 6 related to the present embodiment to detect the inclination angle with higher accuracy.

Next, a description will be given of a data acquisition device according to an embodiment of the present invention.

Note that, when components of an inclination sensor included in the data acquisition device according to the present embodiment are the same as the components of the inclination sensor according to the present embodiment described above with reference to FIGS. 1 to 13 and 14A to 14C, a repeated description thereof is omitted as appropriate, and a description will be given with an emphasis on differences between the components.

Figure 15:
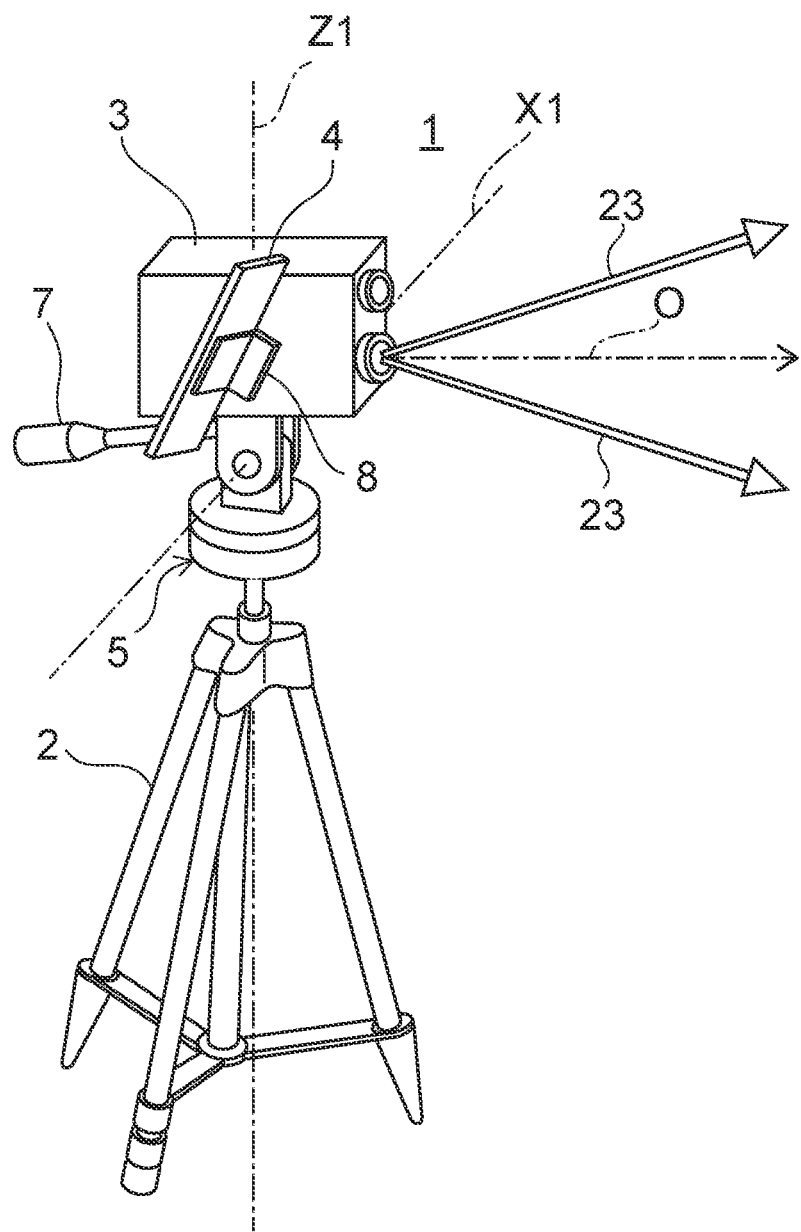
FIG. 15 is a perspective view illustrating a data acquisition device according to an embodiment of the present invention.

FIG. 15 is a perspective view illustrating the data acquisition device according to the embodiment of the present invention.

Examples of the data acquisition device according to the present embodiment include a total station that measures three-dimensional coordinates (three-dimensional data) of a measurement point with high accuracy, a laser scanner unit that applies pulse laser beams as distance measurement beams, while rotating, to perform distance measurement with each of the pulse laser beams and acquire point group data, a laser irradiation device (pipe laser) that sets a reference line when civil engineering work or the like is to be performed, a rotating laser, and the like. In the description of the present embodiment, as an example of the data acquisition device including the inclination sensor 6 according to the present embodiment, the laser scanner unit is used. Note that the laser scanner unit described below is provided with a deflection unit including a pair of optical prisms 36a and 36b, but the inclination sensor 6 according to the present embodiment is not applied only to the laser scanner unit provided with the pair of optical prisms 36a and 36b, and is also applicable to a typical laser scanner unit not provided with the pair of optical prisms 36a and 36b. In addition, the inclination sensor 6 according to the present embodiment is not dedicated to use in the laser scanner, and is usable as a typical inclination sensor.

The data acquisition device 1 illustrated in FIG. 15 is a laser scanner unit, which is an example of the "data acquisition device" in the present invention. A reference optical axis O illustrated in FIG. 15 indicates an optical axis in a state where there is no deflection by the deflection unit 35 described later. The optical axis in the state where there is no deflection by the deflection unit 35 is a straight optical axis extending through a center of the deflection unit 35, which corresponds to the reference optical axis.

The data acquisition device 1 mainly includes a tripod 2 serving as a supporting device, a laser scanner 3, an operation device 4, and a mounting stand unit 5. The inclination sensor 6 described above with reference to FIGS. 1 to 13 and 14A to 14C is provided inside the laser scanner 3. The mounting stand unit 5 is attached to an upper end of the tripod 2. The laser scanner is mounted on the mounting stand unit 5 to be laterally rotatable and vertically rotatable. Thus, the inclination sensor 6 according to the present embodiment is provided inside the laser scanner 3 mounted in a rest state on the tripod 2 and on the mounting stand unit 5.

The mounting stand unit 5 is provided with a laterally extending lever 7. By operating the lever 7, a worker can rotate the laser scanner 3 in an up/down direction (vertical direction) or in a lateral direction (horizontal direction) and can also fix the laser scanner 3 in a required attitude.

The laser scanner 3 has a distance measurement unit 3A (see FIG. 16) and the inclination sensor 6 (see FIG. 16) which are embedded therein. The distance measurement unit 3A ejects a measurement beam 23 toward an object to be measured or a measurement range and receives a reflected measurement beam 24 (see FIG. 16) to perform measurement. The inclination sensor 6 is capable of accurately detecting the attitude of the laser scanner 3 with respect to the horizontal (or vertical) direction. For example, the inclination sensor 6 detects an inclination angle of the laser scanner 3 with respect to the horizontal direction.

The operation device 4 has a communication function of performing communication with the laser scanner 3 via a required wired/wireless means or the like. The operation device 4 is detachable from the laser scanner 3 via an attachment 8. The worker can hold the detached operation device 4 with one hand and operate the operation device 4, and can also remotely control the laser scanner 3 by using the operation device 4.

The laser scanner 3 further transmits an image, a measured state, a measurement result, or the like to the operation device 4. The image, the measured state, the measurement result, or the like transmitted from the laser scanner 3 is stored in the operation device 4 and displayed on a display unit (not shown) of the operation device 4. For example, the operation device 4 is a smartphone.

Figure 16:
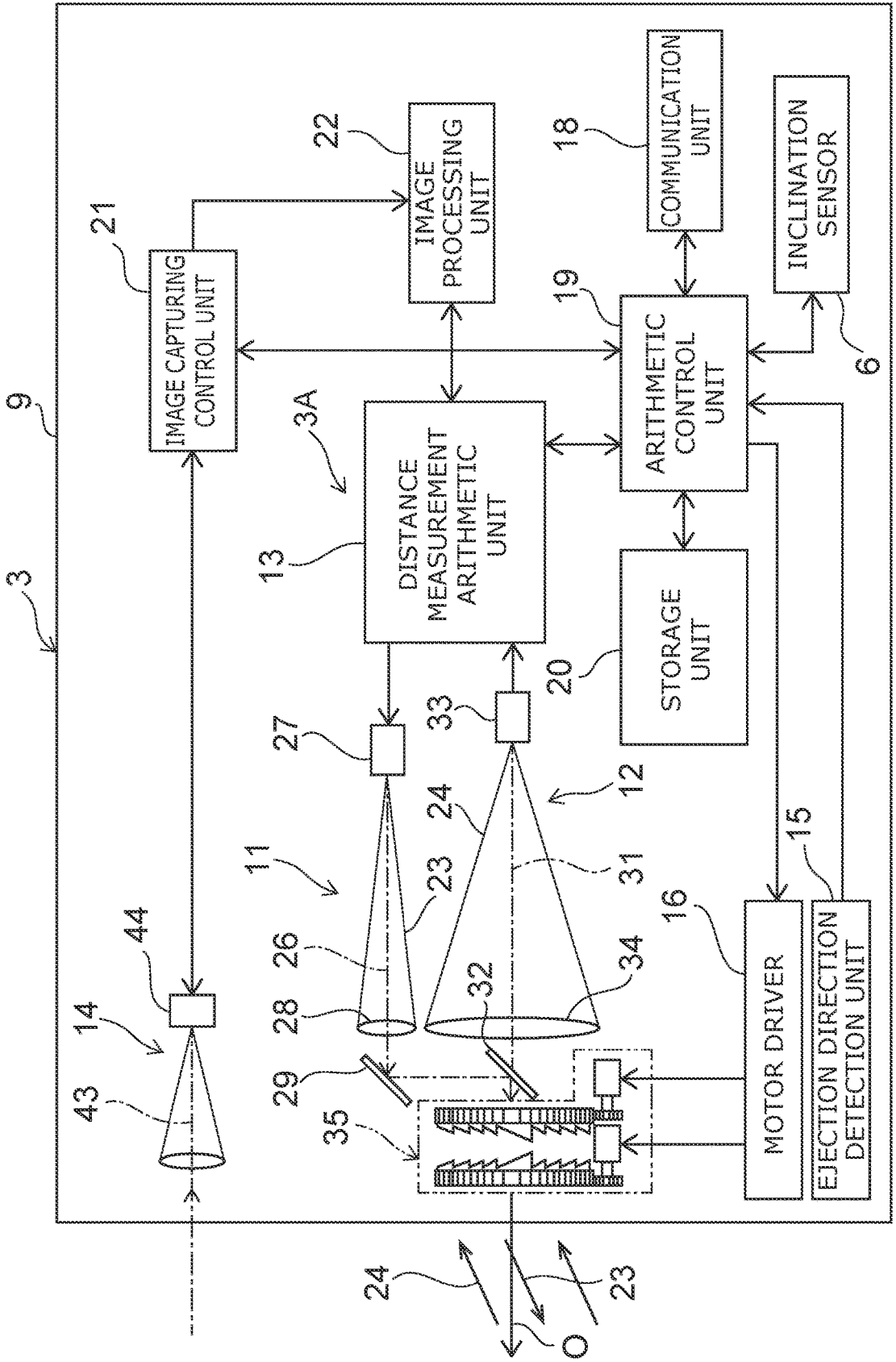
FIG. 16 is a block diagram illustrating a laser scanner in the present embodiment.

FIG. 16 is a block diagram illustrating the laser scanner in the present embodiment.

Figure 17:
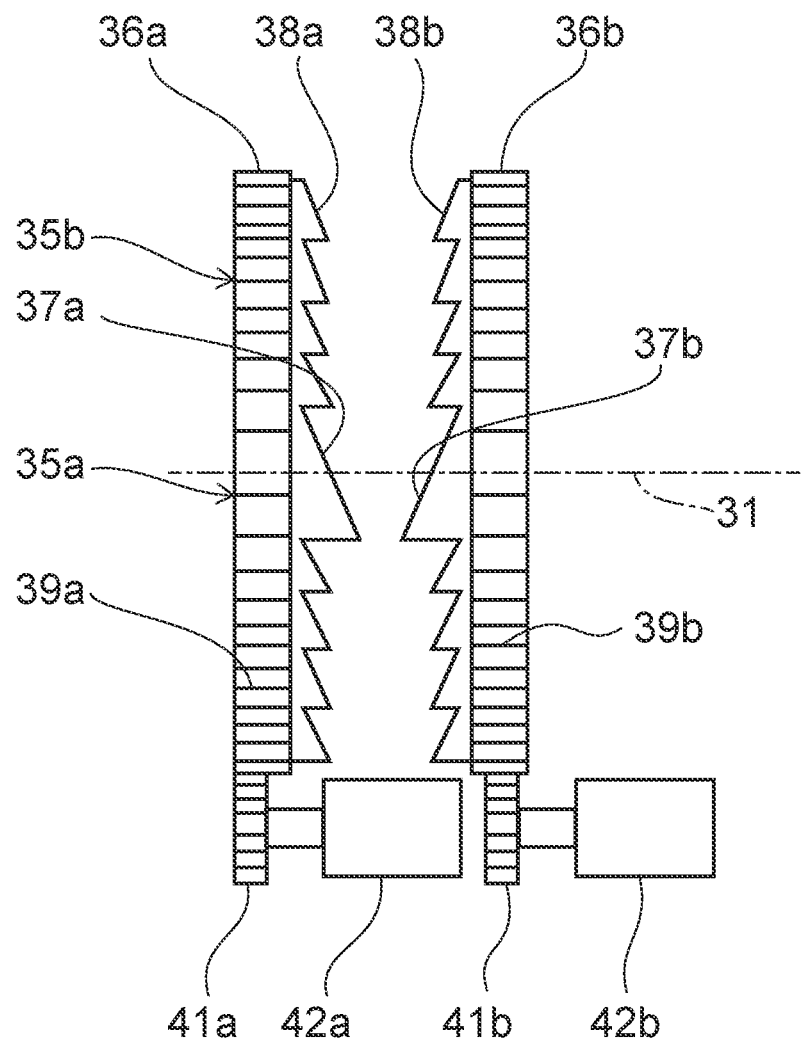
FIG. 17 is a schematic view illustrating a deflection unit in the present embodiment.

FIG. 17 is a schematic view illustrating the deflection unit in the present embodiment.

The laser scanner 3 includes a measurement beam ejection unit 11, a beam reception unit 12, a distance measurement arithmetic unit 13, an image capturing unit 14, an ejection direction detection unit 15, a motor driver 16, an inclination sensor 6, a communication unit 18, an arithmetic control unit 19, a storage unit 20, an image capturing control unit 21, and an image processing unit 22. These components are integrally contained in a casing 9. Note that the measurement beam ejection unit 11, the beam reception unit 12, the distance measurement arithmetic unit 13, and the like are included in at least a portion of the distance measurement unit 3A. Also, the arithmetic control unit 19 in the present embodiment is an example of a "control unit that controls a distance measurement unit", i.e., a "second control unit" in the present invention.

The measurement beam ejection unit 11 has an ejection optical axis 26. On the ejection optical axis 26, a beam emission element 27 such as, e.g., a laser diode (LD) is provided. Additionally, on the ejection optical axis 26, a projector lens 28 is also provided. By a first reflecting mirror 29 provided as a deflection optical member further provided on the ejection optical axis 26 and by a second reflecting mirror 32 provided as a deflection optical member on a beam reception optical axis 31, the ejection optical axis 26 is deflected so as to coincide with the beam reception optical axis 31. The first reflecting mirror 29 and the second reflecting mirror 32 are included in at least a portion of an ejection optical axis deflection unit. A beam emission element 27 emits a pulse laser beam. The measurement beam ejection unit 11 ejects the pulse laser beam emitted from the beam emission element 27 as the measurement beam 23.

A description will be given of the beam reception unit 12. On the beam reception unit 12, the reflected measurement beam 24 reflected from the object to be measured (i.e., the measurement point) is incident. The beam reception unit 12 has the beam reception optical axis 31. As described above, with the beam reception optical axis 31, the ejection optical axis 26 deflected by the first reflecting mirror 29 and the second reflecting mirror 32 coincides.

On the deflected ejection optical axis 26, i.e., on the beam reception optical axis 31, the deflection unit 35 (described later) is disposed. A straight optical axis extending through the center of the deflection unit 35 serves as the reference optical axis O. The reference optical axis O coincides with the ejection optical axis 26 or the beam reception optical axis 31 when there is no deflection by the deflection unit 35.

On the beam reception optical axis 31 on which the beam transmitted by the deflection unit 35 is incident, an imaging lens 34 and a beam reception element 33 such as, e.g., a photodiode (PD) are provided. The imaging lens 34 images the reflected measurement beam 24 onto the beam reception element 33. The beam reception element 33 receives the reflected measurement beam 24 and generates a beam reception signal. The beam reception signal is input to the distance measurement arithmetic unit 13. The distance measurement arithmetic unit 13 measures a distance to the measurement point on the basis of the beam reception signal.

Referring to FIG. 17, a description will be given of the deflection unit 35. The deflection unit 35 has the pair of optical prisms 36a and 36b. The optical prisms 36a and 36b are each in the form of a disc, are placed on the beam reception optical axis 31 to be perpendicular thereto and disposed to overlap each other in parallel relation. As each of the optical prisms 36a and 36b, a Risley prism is used preferably to reduce a size of the device. A center portion of the deflection unit serves as a measurement beam deflection unit 35a corresponding to a first deflection unit through which the measurement beam 23 is transmitted and ejected. The portion of the deflection unit 35 other than the center portion serves as a reflected measurement beam deflection unit 35b corresponding to a second deflection unit which the reflected measurement beam 24 is transmitted through and incident on.

The Risley prisms used as the optical prisms 36a and 36b have prism elements 37a and 37b formed parallel to each other and numerous prism elements 38a and 38b, and exhibit disc shapes. The optical prisms 36a and 36b, the individual prism elements 37a and 37b, and the prism elements 38a and 38b have the same optical properties.

The prism elements 37a and 37b are included in the measurement beam deflection unit 35a. The prism elements 38a and 38b are included in the reflected measurement beam deflection unit 35b. The Risley prisms may be produced from optical glass or may also be mold-formed from an optical plastic material. By mold-forming the Risley prisms from the optical plastic material, low-cost Risley prisms can be produced.

The optical prisms 36a and 36b are disposed to be independently and individually rotatable around the beam reception optical axis 31. The optical prisms 36a and 36b have respective rotation directions, rotation amounts, and rotation speeds independently controlled to deflect the measurement beam 23 passing through the ejection optical axis 26 in an optional direction and deflect the reflected measurement beam 24 received thereby to be parallel to the beam reception optical axis 31. Each of outer shapes of the optical prisms 36a and 36b is a circle having the beam reception optical axis 31 at a center thereof. Diameters of the optical prisms 36a and 36b are set to allow the optical prisms 36a and 36b to acquire sufficient amounts of beams in consideration of spreading of the reflected measurement beam 24.

Around an outer periphery of the optical prism 36a, a ring gear 39a is provided to be fitted therein. Around an outer periphery of the optical prism 36b, a ring gear 39b is provided to be fitted therein. With the ring gear 39a, a drive gear 41a is engaged. The drive gear 41a is fixed to an output shaft of a motor 42a. Likewise, with the ring gear 39b, the drive gear 41*b* is engaged. The drive gear 41*b* is fixed to an output shaft of a motor 42*b*. The motors 42*a* and 42*b* are electrically connected to the motor driver 16.

As each of the motors 42*a* and 42*b*, a motor capable of detecting a rotation angle or a motor that rotates in correspondence to a drive input value, e.g., a pulse motor is used. Alternatively, a rotation amount of each of the motors may also be detected using a rotation angle detector that detects a rotation amount (rotation angle) of the motor such as, e.g., an encoder. The respective rotation amounts of the motors 42*a* and 42*b* are detected, and the motors 42*a* and 42*b* are individually controlled by the motor driver 16. Note that respective encoders attached directly to the ring gears 39*a* and 39*b* may also directly detect the rotation angles of the ring gears 39*a* and 39*b*.

The drive gears 41*a* and 41*b* and the motors 42*a* and 42*b* are provided at positions that do not interfere with the measurement beam ejection unit 11, e.g., under the ring gears 39*a* and 39*b*.

The projector lens 28, the first reflecting mirror 29, the second reflecting mirror 32, the measurement beam deflection unit 35*a*, and the like are included in at least a portion of a projection optical system. The reflected measurement beam deflection unit 35*b*, the imaging lens 34, and the like form at least a portion of a beam reception optical system.

The distance measurement arithmetic unit 13 controls the beam emission element 27 to generate the pulse laser beam as the distance measurement beam 23. The measurement beam 23 is deflected by the prism elements 37*a* and 37*b* (the measurement beam deflection unit 35*a*) so as to travel toward the measurement point.

The reflected measurement beam 24 reflected from the object to be measured is incident via the prism elements 38*a* and 38*b* (the reflected measurement beam deflection unit 35*b*) and the imaging lens 34 to be received by the beam reception element 33. The beam reception element 33 transmits the beam reception signal to the distance measurement arithmetic unit 13. The distance measurement arithmetic unit 13 measures a distance to the measurement point (point irradiated with the measurement beam 23) with each one of the pulse beams on the basis of the beam reception signal from the beam reception element 33. Distance measurement data is stored in the storage unit 20. The distance measurement arithmetic unit 13 performs distance measurement with each one of the pulse beams, while performing scanning with the measurement beam 23, to be able to acquire the distance measurement data about each of the measurement points.

The ejection direction detection unit 15 counts drive pulses input to the motors 42*a* and 42*b* to detect the rotation angles of the motors 42*a* and 42*b*. Alternatively, the ejection direction detection unit 15 detects the rotation angles of the motors 42*a* and 42*b* on the basis of a signal from the encoder. The ejection direction detection unit 15 also arithmetically determines rotation positions of the optical prisms 36*a* and 36*b* on the basis of the rotation angles of the motors 42*a* and 42*b*.

The ejection direction detection unit 15 further arithmetically determines an ejection direction of the measurement beam 23 on the basis of refractive indices and the rotation positions of the optical prisms 36*a* and 36*b* and outputs a result of the arithmetic determination to the arithmetic control unit 19. The arithmetic control unit 19 arithmetically determines, from the ejection direction of the measurement beam 23, a horizontal angle $\theta1$ and a vertical angle $\theta2$ of the measurement point with respect to the reference optical axis O and associates, for each one of the measurement points, the horizontal angle $\theta1$ and the vertical angle $\theta2$ with the distance measurement data to be able to obtain three-dimensional data about the measurement point.

A description will be given of the inclination sensor 6. The inclination sensor 6 is fixed to the casing 9 or fixed to a structure member to be integrated with the laser scanner 3. As described above, to the inclination sensor 6, the acceleration sensor 631 is attached via the gimbal mechanism 60. The acceleration sensor 631 is 360° rotatable around two axes perpendicular to each other.

When the acceleration sensor 631 is inclined (when the laser scanner 3 is inclined), an inclination angle and an inclination direction of the laser scanner 3 are detected on the basis of a result of the detection by the acceleration sensor 631. This is exactly the same as described above with reference to FIGS. 1 to 13 and 14A to 14C. Since the acceleration sensor 631 is 360° rotatable around the two axes, no matter which attitude the inclination sensor 6 takes (e.g., even when the inclination sensor 6 is upside down), the attitude can be detected in all directions.

The arithmetic control unit 19 controls the motor on the basis of the signal from the acceleration sensor 631 even when an inclination variation is large or an inclination change is rapid. The arithmetic control unit 19 also controls the motor on the basis of the signal from the acceleration sensor 631 even when the inclination variation is small or the inclination change is slow.

The image capturing unit 14 is a camera having an image capturing optical axis 43 parallel to the reference optical axis O of the laser scanner 3 and having an angle of view of, e.g., 50°, and acquires image data including a scanning range of the laser scanner 3. Relations among the image capturing optical axis 43, the ejection optical axis 26, and the reference optical axis O are known. In addition, the image capturing unit 14 can acquire a dynamic image or a continuous image.

The image capturing control unit 21 controls image capturing by the image capturing unit 14. When the image capturing unit 14 captures a dynamic image or a continuous image, the image capturing control unit 21 synchronizes timing at which frame images included in the dynamic image or the continuous image are acquired with timing at which scanning is performed with the laser scanner 3. The arithmetic control unit 19 also associates an image with the point group data.

The image capturing element 44 of the image capturing unit 14 is a CCD or CMOS sensor corresponding to a collection of pixels. Each of the pixels of the image capturing element 44 has a position that can be specified on an image element. For example, each of the pixels has pixel coordinates in a coordinate system with the image capturing optical axis 43 used as an origin. The position on the image element is specified by the pixel coordinates. The image processing unit 22 performs image processing of superimposing information to be displayed using the operation device 4 on image data acquired by the image capturing unit 14 or the like. The image generated by the image processing unit 22 is displayed by the arithmetic control unit 19 on a display unit 4*a* of the operation device 4.

In the data acquisition device 1 according to the present embodiment, the control unit 66 of the inclination sensor 6 arithmetically determines the inclination angle with respect to the horizontal direction not on the basis of the output values from the acceleration sensor 631, but on the basis of the result of applying the frequency analysis to the output values from the acceleration sensor 631. Thus, the control unit 66 can arithmetically determine the inclination angle with respect to the horizontal direction by applying the frequency analysis to the output values from the acceleration sensor 631 instead of acquiring high-accuracy output values from the acceleration sensor 631. As a result, even when drift occurs in the output values from the acceleration sensor 631, the inclination sensor 6 can ensure the accuracy of detecting the inclination angle with respect to the horizontal direction by using the frequency analysis. In addition, since there is no need for a tilt sensor capable of high-accuracy detection or the like, the inclination sensor 6 can be reduced in size. This allows the data acquisition device 1 to be reduced in size.

By thus applying the frequency analysis to the output values from the acceleration sensor 631, the control unit 66 of the inclination sensor 6 can separate behaviors of the individual axes (e.g., the X-axis, the Y-axis, and the Z-axis) of the acceleration sensor 631 when the first motor 654 is rotate from behaviors of the individual axes (e.g., the X-axis, the Y-axis, and the Z-axis) of the acceleration sensor 631 when the second motor 644 is rotated and ensure the accuracy of detecting the inclination angle with respect to the horizontal direction. In other words, the control unit 66 can arithmetically determine the inclination angle with respect to the horizontal direction by driving the first motor 654 and the second motor 644 to simultaneously rotate the front-rear shaft 65 and the left-right shaft 64 and applying the frequency analysis to the output values from the acceleration sensor 631 instead of, e.g., driving only the first motor 654 to rotate only the front-rear shaft 65 or driving only the second motor 644 to rotate only the left-right shaft 64. As a result, the control unit 66 need not individually arithmetically determine the inclination angles with respect to the horizontal direction when only the front-rear shaft 65 is rotated and when only the left-right shaft 64 is rotated, and can arithmetically determine the inclination angle with respect to the horizontal direction by simultaneously rotating the front-rear shaft 65 and the left-right shaft 64. This allows the inclination sensor 6 of the data acquisition device 1 according to the present embodiment to sense the inclination angle with respect to the horizontal direction in real time.

Hereinabove, the embodiment of the present invention has been described. However, the present invention is not limited to the above-described embodiment, and various changes can be made without departing from the scope of the claims. The components of the above-described embodiment may be partially omitted or may be arbitrarily combined with each other so as to be different from that described above.

What is claimed is:

1. An inclination sensor comprising:
    a gimbal mechanism having a first shaft and a second shaft perpendicular to the first shaft and rotatably supported around the first shaft and the second shaft;
    a first motor that rotates the first shaft;
    a second motor that rotates the second shaft;
    an acceleration sensor disposed in the gimbal mechanism with an origin point of coordinate axes being coincident with a point of intersection of a shaft center of the first shaft and a shaft center of the second shaft; and
    a control unit that drives the first motor and the second motor to simultaneously rotate the first shaft and the second shaft and thereby continuously rotate the acceleration sensor around the first shaft and the second shaft, and applies frequency analysis to output values from the acceleration sensor to arithmetically determine an inclination angle with respect to a horizontal direction.

2. The inclination sensor according to claim 1, further comprising:
    a first encoder that detects a rotation angle of the first shaft rotated by the first motor; and
    a second encoder that detects a rotation angle of the second shaft rotated by the second motor, wherein
    the control unit arithmetically determines the inclination angle on the basis of at least one of the rotation angle of the first shaft from a reference position that is detected by the first encoder and the rotation angle of the second shaft from the reference position that is detected by the second encoder when the frequency analysis is applied to the output values from the acceleration sensor.

3. The inclination sensor according to claim 2, wherein the control unit acquires the output values from the acceleration sensor at timing at which at least one of the rotation angle of the first shaft detected by the first encoder and the rotation angle of the second shaft detected by the second encoder exhibits a predetermined angle, and synchronizes at least one of the rotation angle of the first shaft and the rotation angle of the second shaft with the output values from the acceleration sensor.

4. The inclination sensor according to claim 3, wherein the control unit senses the timing on the basis of at least one of an output signal from the first encoder and an output signal from the second encoder.

5. The inclination sensor according to claim 3, wherein the control unit matches at least one of a control cycle period of the first motor and a control cycle period of the second motor with a time interval at which the output values from the acceleration sensor are acquired.

6. The inclination sensor according to claim 2, wherein
    the first shaft extends in a front-rear direction,
    the second shaft extends in a left-right direction, and
    the coordinate axes include an X-axis coincident with the shaft center of the first shaft and a Y-axis coincident with the shaft center of the second shaft.

7. The inclination sensor according to claim 2, wherein the control unit arithmetically determines a rotation speed of the first shaft on the basis of the rotation angle of the first shaft detected by the first encoder, arithmetically determines a rotation speed of the second shaft on the basis of the rotation angle of the second shaft detected by the second encoder, and performs an arithmetic operation to remove a component related to a centrifugal force which is included in the output values from the acceleration sensor due to the rotation speed of the first shaft and the rotation speed of the second shaft.

8. A data acquisition device comprising:
    a distance measurement unit including a beam emission element that emits a measurement beam, a measurement beam ejection unit that ejects the measurement beam, a beam reception unit that receives a reflected measurement beam, and a beam reception element that receives the reflected measurement beam and generates a beam reception signal, the distance measurement unit measuring a distance to an object to be measured on the basis of the beam reception signal from the beam reception element;
    an inclination sensor; and
    a control unit that controls the distance measurement unit, the inclination sensor including:
        a gimbal mechanism having a first shaft and a second shaft perpendicular to the first shaft and rotatably supported around the first shaft and the second shaft;
        a first motor that rotates the first shaft;

a second motor that rotates the second shaft;
an acceleration sensor disposed in the gimbal mechanism with an origin point of coordinate axes being coincident with a point of intersection of a shaft center of the first shaft and a shaft center of the second shaft; and
a control unit that drives the first motor and the second motor to simultaneously rotate the first shaft and the second shaft and thereby continuously rotate the acceleration sensor around the first shaft and the second shaft, and applies frequency analysis to output values from the acceleration sensor to arithmetically determine an inclination angle with respect to a horizontal direction,
the control unit of the inclination sensor being a first control unit,
the control unit that controls the distance measurement unit being a second control unit.

\* \* \* \* \*